(12) United States Patent
Mikami et al.

(10) Patent No.: US 8,999,463 B2
(45) Date of Patent: Apr. 7, 2015

(54) GLARE-PROOFING OPTICAL LAMINATE

(75) Inventors: Koichi Mikami, Okayama (JP);
Yukimitsu Iwata, Aioi (JP); Yoshihiro Nishimura, Okayama (JP); Takashi Kodama, Okayama (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 818 days.

(21) Appl. No.: 11/817,818

(22) PCT Filed: Mar. 29, 2006

(86) PCT No.: PCT/JP2006/306512
§ 371 (c)(1),
(2), (4) Date: Apr. 9, 2008

(87) PCT Pub. No.: WO2006/106757
PCT Pub. Date: Oct. 12, 2006

(65) Prior Publication Data
US 2009/0002831 A1   Jan. 1, 2009

(30) Foreign Application Priority Data

Mar. 30, 2005 (JP) ................................ 2005-098619

(51) Int. Cl.
*C09K 19/00* (2006.01)
*G02B 5/02* (2006.01)
*G02B 5/30* (2006.01)

(52) U.S. Cl.
CPC . *G02B 1/111* (2013.01); *G02B 5/02* (2013.01); *G02B 5/3033* (2013.01)

(58) Field of Classification Search
CPC .......... G02B 1/11; G02B 1/111; G02B 1/105; G05B 5/02; G05B 5/021; G05B 5/0221; G05B 5/0226; G05B 5/0231; G05B 5/0242; G05B 5/04; G02F 1/133502; G02F 1/133504; C09D 7/1283

USPC .......... 428/1.3, 141, 323, 328, 220, 212, 332, 428/143, 145, 163.4, 167; 359/586, 613, 359/615, 599, 601; 349/112
See application file for complete search history.

(56) References Cited

U.S. PATENT DOCUMENTS 5,759,643 A * 6/1998 Miyashita et al. ........... 428/1.31
6,559,915 B1 * 5/2003 Amimori et al. ............. 349/112
(Continued)

FOREIGN PATENT DOCUMENTS

JP   06-018706       1/1994
JP   10-325901 A1   12/1998
(Continued)

OTHER PUBLICATIONS

Japanese Office Action dated Aug. 21, 2012.
(Continued)

*Primary Examiner* — Gwendolyn Blackwell
*Assistant Examiner* — Ruiyun Zhang
(74) *Attorney, Agent, or Firm* — Burr & Brown, PLLC

(57) ABSTRACT

An anti-dazzling laminate made of an optical laminate including a light transparent base material and an anti-dazzling layer having a concavoconvex shape provided on the material. The laminate simultaneously satisfies formulae: $0 \leq G_{100} \leq 15$ (I), $0.1 \leq Hs \leq 5.0$ (II), $0.3 \leq Rz \leq 1.8$ (III) wherein $G_{100}$ represents a scintillation value which is a standard deviation of a variation in brightness distribution at a resolution of 100 ppi measured on the surface of the laminate; Hs represents the surface haze value of the laminate; and Rz represents the average roughness of the concavoconvex shape of the anti-dazzling layer.

4 Claims, 1 Drawing Sheet

(56) References Cited

U.S. PATENT DOCUMENTS

| | | | |
|---|---|---|---|
| 6,577,756 B1 | 6/2003 | Furui | |
| 6,861,121 B2 | 3/2005 | Matsunaga et al. | |
| 7,245,434 B2 | 7/2007 | Nishida et al. | |
| 7,264,865 B2 | 9/2007 | Matsunaga et al. | |
| 2002/0028328 A1* | 3/2002 | Onozawa et al. | 428/331 |
| 2002/0122257 A1* | 9/2002 | Suga et al. | 359/580 |
| 2002/0142133 A1* | 10/2002 | Matsunaga et al. | 428/141 |
| 2002/0150722 A1 | 10/2002 | Suzuki | |
| 2003/0234460 A1* | 12/2003 | Hayashi et al. | 264/2.7 |
| 2004/0150874 A1 | 8/2004 | Suzuki | |
| 2004/0156110 A1 | 8/2004 | Ikeyama | |
| 2006/0159902 A1 | 7/2006 | Suzuki | |
| 2011/0013127 A1 | 1/2011 | Takahashi | |

FOREIGN PATENT DOCUMENTS

| | | | |
|---|---|---|---|
| JP | 2000-304648 A1 | | 11/2000 |
| JP | 2000-338310 A1 | | 12/2000 |
| JP | 2002-022952 A1 | | 1/2002 |
| JP | 2002-196111 A1 | | 7/2002 |
| JP | 2002-196117 A1 | | 7/2002 |
| JP | 2003-114303 A1 | | 4/2003 |
| JP | 2003-114304 A1 | | 4/2003 |
| JP | 2003-205563 A1 | | 7/2003 |
| JP | 2003-302506 | | 10/2003 |
| JP | 2004-004644 A1 | | 1/2004 |
| JP | 2004-069867 A1 | | 3/2004 |
| JP | 2004-198606 A1 | | 7/2004 |
| JP | 2004-263082 A1 | | 9/2004 |
| JP | 2004-279491 A1 | | 10/2004 |
| JP | 2004-341070 | | 12/2004 |
| JP | 2005-047283 A1 | | 2/2005 |
| JP | 2005-070744 | * | 3/2005 |
| JP | 2005-070744 A1 | | 3/2005 |
| JP | 2005-077860 | * | 3/2005 |
| JP | 2005-077860 A1 | | 3/2005 |
| TW | 438965 B | | 6/2001 |
| TW | 520445 B | | 2/2003 |
| WO | 02/075373 A1 | | 9/2002 |

OTHER PUBLICATIONS

Japanese Office Action dated Dec. 14, 2012 (with English translation).

Japanese Office Action dated May 17, 2013 (with English translation).

Japanese Office Action (Application No. 2011-245943) dated Aug. 30, 2013 (with English translation).

Japanese Office Action (Application No. 2011-245943; Trial No. 2013-023640) dated Jan. 14, 2014 (with English translation).

Japanese Office Action (Application No. 2013-249544) dated Nov. 7, 2014 (with English translation).

Japanese Office Action (Trial No. 2013-23640; Application No. 2011-245943) dated Nov. 7, 2014 (with English translation).

* cited by examiner

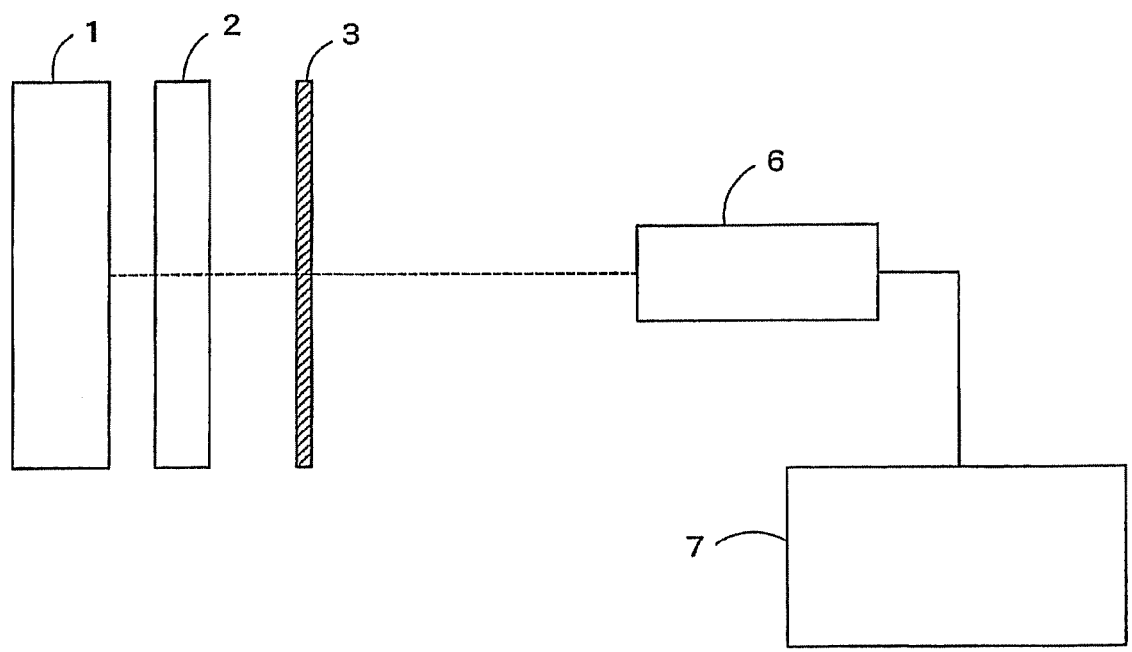

GLARE-PROOFING OPTICAL LAMINATE

CROSS-REFERENCE TO RELATED APPLICATIONS

This application is based upon and claims the benefit of priority from the prior Japanese Patent Applications No. 98619/2005 under the Paris Convention, and, thus, the entire contents thereof are incorporated herein by reference.

FIELD OF THE INVENTION

The present invention provides an anti-dazzling optical laminate for use in displays such as CRTs, PDPs and liquid crystal panels.

BACKGROUND OF THE INVENTION

The prevention of lowered contrast and lowered visibility caused by external light reflection or image reflection is required of image display devices, for example, cathode-ray tube display devices (CRTs), plasma displays (PDPs), electroluminescent displays (ELDs), or liquid crystal displays (LCDs). Accordingly, it is common practice to provide an antireflection laminate on the outermost surface of an image display device from the viewpoint of reducing image reflection or reflectance using the principle of light scattering or the principle of optical interference.

In image display devices, for example, liquid crystal displays, the use of an anti-dazzling laminate as one of antireflection laminates has hitherto been known for realizing regulating optical properties to realize excellent image displays. The anti-dazzling laminate is utilized for preventing a lowering in visibility as a result of external light reflection or image reflection within image display devices. The anti-dazzling laminate is generally realized by forming an anti-dazzling layer having a concavoconvex shape on a base material. Regarding the formation of the anti-dazzling layer having a concavoconvex shape, a method has been proposed in which a resin containing a filler such as silicon dioxide (silica) is coated onto a surface of a transparent base material (Japanese Patent Laid-Open No. 18706/1994 and Japanese Patent Laid-Open No. 302506/2003). A method has also been proposed in which a concavoconvex shape is formed by embossing treatment (Japanese Patent Laid-Open No. 341070/2004).

In recent years, a demand for a higher level of definition of panel resolution has led to a higher level of fineness of the concavoconvex shape of the anti-dazzling layer. Accordingly, a concavoconvex shape having a broad and large curve has been regarded as unsuitable for meeting a demand for higher definition in the anti-dazzling laminate having the above construction and thus have not been adopted. On the other hand, when increasing the fineness of the concavoconvex shape involved in higher definition of panel resolution can meet a demand for higher definition of the panel resolution. Regarding this technique, however, it has often been pointed out that, for example, external light is reflected from the display surface resulting in such a phenomenon that, for example, the image display surface is seen white (whitening), or lowered contrast. When the anti-dazzling laminate is used on the image display surface of notebook computers and the like, a certain level of satisfactory optical properties can be provided. When the light transmitted through the backside (backlight) or the like within a display is transmitted through the concavoconvex shape face of the anti-dazzling laminate formed on the outermost surface of the panel, however, the concavoconvex shape functions as fine lenses which disturb the displayed pixels and the like, that is, "glare" is likely to occur. This unfavorable phenomenon makes it difficult to attain the effect of the anti-dazzling laminate per se. In particular, in fact, an enhancement in panel resolution has lead to a demand for further effective prevention of this "glare."

In order to eliminate "glare" caused by an enhancement in panel resolution, for example, a method has been adopted in which surface concavoconvexes are densely provided to enhance the sharpness and, at the same time, scattering particles different from the resin for anti-dazzling layer formation in refractive index are added to, for example, impart internal scattering effect to the anti-dazzling laminate. All of proposed methods could satisfactorily solve the problem of the "glare," but on the other hand, they sometimes lowered the visibility of the whole image. On the other hand, in the anti-dazzling laminate, the method for reducing the "glare" in high-definition panels has been regarded as a main cause of an unfavorable phenomenon, for example, a deterioration in contrast such as clouding caused by surface whitening, internal scattering effect or the like. That is, it has been regarded that "glare prevention" and "contrast improvement" are in the relationship of tradeoff, and simultaneously meeting both the requirements is difficult. In the above methods, for example, black color reproduction including jet black feeling (glossy black color feeling: wet glossy black color) in on-screen display, contrast and the like have sometimes been poor. That is, gradation rendering of black color in a light room, particularly a black color gradation difference in low gradation, cannot be regarded without difficulties resulting in lowered sensitivity. Specifically, in some cases, black and gray colors are only recognized as a blurred and identical color-tone black color. In particular, it can be said that an anti-dazzling laminate having better anti-glare properties has a significantly lowered level of visibility.

Accordingly, at the present time, the development of an optical laminate, which can effectively prevent the glare of an image surface and can realize good black color reproduction, especially glossy black color feeling, has been desired. In particular, an optical laminate, which can be used in liquid crystal displays (LCDs) as well as in other applications such as cathode ray tube display devices (CRTs), plasma displays (PDPs), electroluminescent displays, fluorescent display tubes, and field emission-type displays, has been eagerly desired.

SUMMARY OF THE INVENTION

At the time of the present invention, the present inventors have found that an optical laminate can be provided which, while imparting an anti-dazzling property, can realize the so-called jet black feeling by improving the antiglare property at a resolution of about 100 ppi or more and the contrast, especially by improving black color reproduction and, at the same time, can realize a very low surface haze value (Hs) of 0.1 to 5.0%. The present invention has been made based on such finding.

Accordingly, an object of the present invention is to provide an optical laminate which, despite a very low surface haze value (Hs), can realize excellent anti-dazzling function and an antiglare property at a resolution of about 100 ppi or more and, at the same time, can realize image display having a high level of visibility.

Thus, according to the present invention, there is provided an optical laminate comprising:

a light transparent base material; and an anti-dazzling layer having a concavoconvex shape provided on the light transparent base material, wherein the optical laminate simultaneously satisfies formulae (I) to (III):

$$0 \leq G_{100} \leq 15 \quad \text{(I)}$$

$$0.1 \leq Hs \leq 5.0 \quad \text{(II)}$$

$$0.3 \leq Rz \leq 1.8 \quad \text{(III)}$$

wherein $G_{100}$ represents a scintillation value which is a standard deviation of a variation in brightness distribution at a resolution of 100 ppi measured on the surface of the optical laminate; Hs represents the surface haze value of the optical laminate; and Rz represents the average roughness of the concavoconvex shape of the anti-dazzling layer, the standard deviation of a variation in brightness distribution is one for image data incorporated in such a manner that light from a light source is introduced into the optical laminate through a matrix filter (a black matrix) with a resolution of 100 ppi, and light transmitted through the optical laminate is recognized, and the transmitted light is incorporated as image data in which the average brightness of the incorporated image is 145 cd/m$^2$.

The optical laminate according to the present invention has a very low surface haze value (Hs), has an anti-dazzling property, and can realize black color reproduction having jet black feeling. Further, the optical laminate according to the present invention can effectively realize a high level of sharpness, and satisfactory antiglare properties, contrast, and letter blurring prevention at a resolution of about 100 ppi or more. Further, since there is no interface between the transparent base material and the anti-dazzling layer, any reflection does not occur at the interface and, at the same time, any interference fringe such as a color like an oil film color does not occur on the film surface. Accordingly, the optical laminate according to the present invention can be used in various displays. In particular, according to the optical laminate of the present invention, black color gradation rendering (glossy black color reproduction), which could not have been realized by the conventional anti-dazzling laminate without difficulties, can be significantly improved. More specifically, it is possible to provide an optical laminate which, in an image in movie display, can render gradation substantially comparable with a conventional display on which only a flat clear hard coat layer free from any concavoconvex shape, or a laminate comprising a clear hard coat layer and an antireflection layer, is disposed, and, at the same time, can realize images which are excellent in sharpness of the contour of letters and free from glare. In a preferred embodiment of the present invention, the provision of a surface modifying layer on the anti-dazzling layer means that the surface of the concavoconvex shape constituting the anti-dazzling layer is sealed by the surface modifying layer, and, thus, a large and smooth desired concavoconvex shape can be realized. Further, various functions such as antistatic property, hardness regulation, refractive index regulation, and contamination prevention can be imparted to the optical laminate. When an surface modifying layer is provided on the anti-dazzling layer, the surface concavoconvex shape of the surface modifying layer conforms to the optical property values of the surface concavoconvex shape of the anti-dazzling layer according to the present invention. That is, in the optical laminate according to the present invention, the concavoconvex shape of the outermost surface conforms to the optical property values of the surface concavoconvex shape of the anti-dazzling layer specified in the present invention.

BRIEF DESCRIPTION OF THE DRAWING

FIG. 1 is a schematic diagram showing an apparatus for measuring a scintillation value.

DETAILED DESCRIPTION OF THE INVENTION

Definition

Terms used in the present specification will be defined as follows.

Resin

In the present specification, curable resin precursors such as monomers, oligomers, and prepolymers are defined as "resin," unless otherwise specified.

Haze Value

In the present invention, the haze value is defined as follows.

Surface haze (Hs), internal haze (Hi), and overall haze (Ha)

The term "surface haze (Hs)" as used herein is determined as follows. A proper mixture of an acrylic monomer such as pentaerythritol triacrylate with other oligomer or polymer is diluted with toluene or the like to a solid content of 60%, and the diluted solution is coated with a wire bar onto concavoconvexes of the anti-dazzling layer to a thickness on a dry film basis of 8 μm, whereby the surface concavoconvexes of the anti-dazzling layer are rendered flat. In this case, when the recoating agent is likely to be repelled and less likely to wet the anti-dazzling layer due to the presence of a leveling agent in the composition for anti-dazzling layer formation, a method may be adopted in which the anti-dazzling film is previously rendered hydrophilic by saponification. The saponification is carried out by immersing the anti-dazzling film in a 2 mol/liter NaOH (or KOH) solution (55° C.) for 3 min, washing the film with water, completely removing water droplets with a Kimwipe, and then drying the film in an oven (50° C.) for one min. The film having a flattened surface does not have any haze derived from surface concavoconvexes but has only an internal haze. This haze can be determined as an internal haze (Hi). The value obtained by subtracting the internal haze (Hi) from the original film haze (overall haze (Ha)) is determined as a surface haze (Hs) attributable only to surface concavoconvexes.

Haze Value, 60-Degree Gloss, and Transmission Sharpness

The haze value may be measured according to JIS K 7136. A reflection-transmittance meter HR-100 (Murakami Color Research Laboratory) may be mentioned as an instrument used for the measurement. The total light transmittance of the anti-dazzling laminate may be measured with the same measuring device as in the haze value according to JIS K 7361. The haze and total light transmittance are measured in such a state that the coated face is directed to a light source. The 60-degree gloss can be measured with a precision gloss meter (GM-26D, manufactured by Murakami Color Research Laboratory) according to JIS Z 8741. The 60-degree gloss is measured in such a state that, in order to eliminate the influence of backside reflection of a sample, a double face adhesive tape (manufactured by Teraoka Seisakusho Co., Ltd.) is applied to the backside of a sample and a black lid of the measuring device. The transmission sharpness is expressed in terms of the total of numerical values obtained by measurement with four types of optical combs (0.125 mm, 0.5 mm, 1 mm, and 2 mm) with an image clarity measuring device (stock number; "ICM-1DP", manufactured by Suga Test Instruments Co., Ltd.) according to JIS K 7105.

Form of Surface Shape

In the present invention, in order to visually grasp the surface concavoconvex shape having a high level of waviness, the form of the surface concavoconvex shape was measured as a two-dimensional or three-dimensional profile, for example, by AFM. It is generally difficult to objectively compare curves per se, and, hence, various roughness indexes are calculated based on the profile curve data. For example, the ten-point average roughness is calculated using the above measurement results and is expressed in terms of the sum of the average value of absolute values of the highest five deviation values and the average value of absolute values of the lowest five deviation values among deviation values determined from average values. In the present invention, for example, when a surface modifying layer is provided on the anti-dazzling layer, fine concavoconvexes present along the concavoconvex shape on the scale of one-tenth or less of the concavo-convex scale (convex (or profile) peak height of concavoconvexes and spacing between convex (or profile) peaks) in the surface roughness constituting the concavoconvex shape of the anti-dazzling layer can be sealed for smoothing to form smooth concavoconvexes.

Average Spacing of Concavoconvexes (or Profile Irregularities) Sm ($\mu$m), Average Inclination Angle $\theta$a and Rz ($\mu$m).

The anti-dazzling layer constituting the optical laminate according to the present invention has a concavoconvex shape. Sm ($\mu$m) represents the average spacing of concavoconvexes (or profile irregularities) of the anti-dazzling layer, and $\theta$a (degree) represents the average inclination angle of the concavoconvex part. Sm ($\mu$m) and $\theta$a (degree) may be defined as described in an instruction manual (revised on Jul. 20, 1995) of a surface roughness measuring device (model: SE-3400, manufactured by Kosaka Laboratory Ltd.). $\theta$a (degree) represents the angle mode, and, when the inclination is $\Delta$a in terms of aspect ratio, $\theta$a (degree) is determined by $\theta a = \Delta a = \tan \theta a = $ (sum of differences (corresponding to the height of each convex) between the minimum part and the maximum part in each concavoconvex/reference length). The "reference length" is the same as in the following measuring conditions 1. Regarding the Rz ($\mu$m) average roughness, in the present invention, the average roughness (Rz) is calculated with the above surface roughness measuring device. For example, the ten-point average roughness ($Rz_{10}$) is expressed in terms of the sum of the average value of absolute values of the highest five deviation values and the average value of absolute values of the lowest five deviation values among deviation values determined from average values.

The parameters (Sm, $\theta$a, and Rz) representing the surface roughness of the optical laminate according to the present invention may be measured, for example, with the above surface roughness measuring device under any of the following measuring conditions A and B. This measuring method is favorable in the present invention. The anti-dazzling laminate according to the present invention has a high level of waviness of concavoconvexes. Accordingly, the measurement under conditions A is preferred. (In working examples, the measurement was carried out under conditions A.)

Measuring Conditions A

1) Tracer in surface roughness detector:

Model/SE2555N (standard 2 $\mu$m), manufactured by Kosaka Laboratory Ltd. (radius of curvature in tip 2 $\mu$m/apex angle: 90 degrees/material: diamond)

2) Measuring conditions for surface roughness measuring device:

Reference length (cut-off value of roughness curve $\lambda$c): 2.5 mm

Evaluation length (reference length (cut-off value $\lambda$c)×5): 12.5 mm

Feed speed of tracer: 0.5 mm/sec

Measuring Conditions B

1) Reference length (cut-off value of roughness curve $\lambda$c):

Measuring conditions for ten-point average roughness (Rz) and average inclination angle $\theta$a: 0.25 mm Measuring conditions for average spacing Sm of concavoconvexes: 0.80 mm 2) Evaluation length (reference length (cut-off value $\lambda$c)× 5):

Measuring conditions for ten-point average roughness (Rz) and average inclination angle $\theta$a: 1.25 mm Measuring conditions for average spacing Sm of concavoconvexes: 4.0 mm 3) Feed speed of tracer: 0.1 mm/sec Thickness of Anti-Dazzling Layer The thickness of the anti-dazzling layer refers to a part extended from the base material on its display surface side interface to the outermost surface of the anti-dazzling concavoconvex in contact with the air. In the part extended from the base material interface to the outermost surface, the anti-dazzling layer has either a single layer or a multilayer structure comprising a surface modifying layer and other optical function layers stacked onto the underlying concavoconvex layer.

Method for Measuring Layer Thickness

The cross section of the optical laminate was subjected to transmission observation under a confocal laser microscope (LeicaTCS-NT, manufactured by Leica: magnification "500 to 1000 times") to determine whether or not the interface was present, and the results were evaluated according to the following criteria. Specifically, in order to provide a halation-free sharp image, a wet objective lens was used in a confocal laser microscope, and about 2 ml of an oil having a refractive index of 1.518 was placed on an optical laminate, followed by observation to determine the presence or absence of the interface. The oil was used to allow the air layer between the objective lens and the optical laminate to disappear.

Measurement Procedure

1: The average thickness of the layer was measured by observation under a laser microscope.

2: The measurement was carried out under the above conditions.

3: For one image plane, the layer thickness from the base material to the maximum convex (or profile) peak part in the concavoconvexes was measured for one point, and the layer thickness from the base material to the minimum valley convex (or profile) part in the concavoconvexes was measured for one point. That is, the layer thickness was measured for two points in total for one image plane. This measurement was carried out for five image planes, that is, 10 points in total, and the average value was determined.

Glossy Black Feeling

The glossy black feeling is evaluated by visually observing an assembly comprising an optical laminate provided on a panel which displays a black color under a light room environment. When the reflection angle of light incident on the optical laminate is wide (as in the case of a conventional anti-dazzling layer having concavoconvexes), light is reflected in all directions (diffusion reflected) depending upon the angle of concavoconvexes on the surface of the optical laminate and then reaches the viewer's eye, making it impossible to reproduce the original black color. That is, only a part of the diffused light reaches the viewer's eye. On the other hand, when the incident light is intensively reflected to a part around regular reflection angle (as in an anti-dazzling layer having a gentle concavoconvex shape in the present invention), light from a light source is not substantially diffusion reflected and is brought to regularly reflected light.

Since light other than the regularly reflected light does not reach the viewer's eye, the original wet black color can be reproduced. This original black color is described as glossy black feeling.

Optical Laminate

The optical laminate according to the present invention simultaneously has anti-dazzling properties and excellent contrast. The optical laminate according to the present invention can be said to an antiglare optical laminate (AG), provided with a clear hard coat (glare) layer, very similar in properties to a conventional optical laminate (AR) provided with a clear hard coat (glare) layer.

Hs/Rz

The optical laminate according to the present invention has a surface haze Hs value of not less than 0.1% and not more than 5.0%. Preferably, the upper limit of the surface haze Hs value is 3.0%, more preferably 2.0%, and the lower limit of the surface haze Hs value is 1.0%, more preferably 0.3%. Further, the optical laminate according to the present invention has an average roughness Rz value of not less than 0.3% and not more than 1.8%. Preferably, the upper limit of the average roughness Rz value is 1.6%, more preferably 1.4%, and the lower limit of the average roughness Rz value is 0.4%, more preferably 0.6%.

Scintillation Value ($G_{100}$)

In the present invention, the standard deviation value of the optical laminate surface at a resolution of 100 ppi is defined as a scintillation value ($G_{100}$). The method for measuring the scintillation value ($G_{100}$) according to the present invention will be described with reference to FIG. 1. FIG. 1 is a schematic diagram of an apparatus for measuring the scintillation value ($G_{100}$) according to the present invention. A (white color) light source 1 and a matrix filter (a black matrix) 2 with a resolution of 100 ppi of which the processed face is directed to a light source side are provided while providing a space therebetween. An optical laminate 3 according to the present invention on its surface having a concavoconvex shape is brought to intimate contact with the matrix filter 2 on its surface remote from the light source surface 1.

Light from the light source 1 is introduced into the optical laminate 3 through the matrix filter 2. The introduced light is output as transmitted light from the optical laminate 3. The transmitted light is recognized, for example, by a recognizer (a CCD camera) 6. Next, the recognized transmitted light is incorporated as image data in a computer 7. The incorporated image data may be subjected to image processing for obtaining proper values for digitizing. The image processing comprises a combination of low pass filtering, shading correction, contrast emphasis and the like. In the contrast emphasis, conditions may be set, for example, contrast 93, gamma 30, and brightness 48. In the present invention, image data are incorporated under conditions of an average brightness of an incorporated image of 145 cd/m². The standard deviation of a variation in brightness distribution in the incorporated image data is measured, and the standard deviation value of the surface of the optical laminate at a resolution of 100 ppi is calculated as a scintillation value ($G_{100}$). The measurement method is described in detail in Japanese Patent Laid-Open No. 304648/2000, and the contents of this application constitutes a part of the contents of the application.

The optical equipment which can realize the above measurement is as follows.

Optical image clarity evaluation device: a transmission measurement mode CCD light receiving part CCD camera (KP-M1) in model MJ-RTS (MIZOJIRI OPTICAL CO., LTD.).

C mount adaptor (NIKON CORPORATION)
Closeup ring: (PK-11A NIKON CORPORATION)
Camera lens: (50 mm, F1.4s NIKKOR)

Light source: LIGHT BOX 45 or LIGHT VIEWER 7000 PRO (equivalent product) (HAKUBA)

Matrix filter: pitch 140 μm×170 μm, glass thickness 1 mm

Image processing software: Windows 95 version Image-Pro Plus 3.0 (Media Cybemetics)

In the present invention, the scintillation value $G_{100}$ is not less than 0 and not more than 15. Preferably, the lower limit of the scintillation value is 8, and the upper limit of the scintillation value is 12. When the scintillation value $G_{100}$ is in the above-defined range, excellent scintillation prevention can be realized.

Substantial Elimination of Interface

In a preferred embodiment of the present invention, there is provided an optical laminate free from an interface between a light transparent base material and an anti-dazzling layer. In the optical laminate according to the present invention, the interface is substantially absent between the light transparent base material and the anti-dazzling layer. In the present invention, the expression "interface is (substantially) absent" means that there is no interface although two layer faces are superimposed on top of each other, and further connotes that, based on the refractive index value, the interface is judged to be absent between both the layer faces. A specific example of a criterion based on which the "interface is (substantially) absent" is that, when visual observation of the cross section of the optical laminate under a laser microscope shows the presence of interference fringes, the interface is judged to be present, while, when visual observation of the cross section of the optical laminate under a laser microscope shows the absence of interference fringes, the interface is judged to be absent. The laser microscope can observe the cross section of materials different in refractive index in a nondestructive manner. Accordingly, in the case of materials having no significant difference in refractive index therebetween, the results of the measurement show that there is no interface between these materials. Therefore, it can also be judged based on the refractive index that there is no interface between the base material and the hard coat layer.

The present invention provides an optical laminate comprising an anti-dazzling layer formed using a composition for an anti-dazzling layer, which is penetrable into a light transparent base material (has a capability of swelling or dissolving the base material), whereby the optical laminate has no interface between the light transparent base material and the anti-dazzling layer. Further, there is provided an optical laminate comprising a thin layer provided between the light transparent base material and the anti-dazzling layer, whereby there is no interface between the light transparent base material and the anti-dazzling layer.

Number of Convexes in Concavoconvex Shape

In the present invention, the number of convexes in the concavoconvex shape of the anti-dazzling layer is not less than 40/mm² and not more than 30000/mm² per unit area of the anti-dazzling layer. Preferably, the lower limit of the number of convexes is 50/μm², more preferably 80/μm², and the upper limit of the number of convexes is 20000/mm², more preferably 10000/mm². The number of convexes in the concavoconvex shape is determined by mounting an optical laminate on a panel in an image display device, photographing the surface shape of the optical laminate under an optical microscope (tradename BX60-F3, manufactured by Olympus Corporation; magnification: 100 times), and counting the number of convexes in the concavoconvex shape in an area of 100 mm×100 mm on the photograph.

1. Anti-Dazzling Layer

In the present invention, an anti-dazzling layer is provided on a light transparent base material. In the present invention, a previously formed anti-dazzling layer may be formed on the surface of the optical laminate. Additional methods for forming the anti-dazzling layer on the surface of the optical laminate include 1) a method in which an anti-dazzling layer having a concavoconvex shape is formed using a composition for an anti-dazzling layer comprising fine particles added to a resin, 2) a method in which an anti-dazzling layer having a concavoconvex shape is formed using a composition for an anti-dazzling layer containing only a resin or the like without the addition of fine particles, and 3) a method in which an anti-dazzling layer is formed by using treatment for forming a concavoconvex shape. In the present invention, when an anti-dazzling layer is previously formed, the anti-dazzling layer may be one formed by any one of the above methods 1) to 3). The thickness of the anti-dazzling layer is not less than 0.5 μm and not more than 12 (17) μm. Preferably, the lower limit of the thickness of the anti-dazzling layer is 1 μm, and the upper limit of the thickness of the anti-dazzling layer is 7 μm.

1) Anti-Dazzling Layer Formed Using Composition for Anti-Dazzling Layer Comprising Fine Particles Added to Resin Fine Particles The fine particles may be in a spherical, for example, truly spherical or elliptical form, preferably in a truly spherical form. In the present invention, the average particle diameter R (μm) of the fine particles is not less than 1.0 μm and not more than 20 μm. Preferably, the upper limit is 15.0 μm, and the lower limit is 3.5 μm.

In the present invention, preferably, not less than 80% (preferably not less than 90%) of the whole fine particles is accounted for by fine particles having an average particle diameter distribution of R±1.0 (preferably 0.3) μm. Further, the anti-dazzling layer may further comprise, in addition to the fine particles, second fine particles or third fine particles or a combination of a plurality of types of fine particles different from the fine particles in average particle diameter. For example, for small fine particles of which the average particle diameter R (μm) is approximately the lower limit value, i.e., about 3.5 μm, a concavoconvex layer can be efficiently formed using fine particles having a grain size distribution with the average particle diameter being 3.5 μm rather than monodisperse fine particles.

Aggregation-Type Fine Particles

In a preferred embodiment of the present invention, among various types of fine particles, aggregation-type fine particles can be used. The aggregation-type fine particles may be identical fine particles, or alternatively may be a plurality of types of fine particles, the plurality of types being different from each other in average particle diameter. In a preferred embodiment of the present invention, the aggregation-type fine particles comprise first fine particles and second fine particles different from the first fine particles in average particle diameter. Further, in the present invention, when the aggregation-type fine particles are used, preferably, the second fine particle as such or the aggregation part as such does not exhibit anti-dazzling properties in the anti-dazzling layer.

In the present invention, preferably, the fine particles satisfy the following formula:

$$0.25R \text{ (preferably 0.50)} \leq r \leq 1.0R \text{ (preferably 0.70)}$$

wherein R represents the average particle diameter of the fine particles, μm; and r represents the average particle diameter of the second fine particles, μm. The third fine particles and other fine particles may be those which satisfy the same requirements as in the second fine particles. All the following descriptions regarding the second fine particles can be applied as preferred conditions for all of the third and other particles.

When the r value is not less than 0.25R, the dispersion of the coating liquid is easy and, consequently, the particles are not aggregated. In the step of drying after coating, a uniform concavoconvex shape can be formed without undergoing an influence of wind during floating. Further, when r is not more than 0.85R, advantageously, the function of the fine particles can be clearly distinguished from the function of the first fine particles.

In another embodiment of the present invention, preferably, the total weight ratio per unit area among the resin, fine particles, and second fine particles satisfies requirements represented by formula:

$$0.08 \leq (M_1 + M_2)/M \leq 0.36$$

$$0 \leq M_2 \leq 4.0 M_1$$

wherein $M_1$ represents the total weight of the fine particles per unit area; $M_2$ represents the total weight of the second fine particles per unit area; and M represents the total weight of the resin per unit area.

In another preferred embodiment of the present invention, preferably, a requirement represented by formula is satisfied:

$$\Delta n = |n_1 - n_3| < 0.15 \text{ and/or } \Delta n = |n_2 - n_3| < 0.18$$

wherein $n_1$, $n_2$, and $n_3$ represent the refractive indexes of the fine particles, the second fine particles, and the resin, respectively.

Fine particles (second fine particles) may be of inorganic type and organic type and are preferably formed of an organic material. The fine particles exhibit anti-dazzling properties and are preferably transparent. Specific examples of such fine particles include plastic beads, and transparent plastic beads are more preferred. Specific examples of plastic beads include styrene beads (refractive index 1.60), melamine beads (refractive index 1.57), acrylic beads (refractive index 1.49), acryl-styrene beads (refractive index 1.54), polycarbonate beads, and polyethylene beads. In a preferred embodiment of the present invention, the plastic bead has a hydrophobic group on its surface, and, for example, styrene beads are preferred.

Resin

The anti-dazzling layer according to the present invention may be formed from a (curing-type) resin. The curing-type resin is preferably transparent, and specific examples thereof are classified into three types of resins, that is, ionizing radiation curing resins which are curable upon exposure to ultraviolet light or electron beams, mixtures of ionizing radiation curing resins with solvent drying-type resins (resins such as thermoplastic resins which can be brought to a film by merely removing the solvent by drying for regulating the solid content in the coating), or heat curing resins. Preferred are ionizing radiation curing resins.

Specific examples of ionizing radiation curing resins include those containing an acrylate-type functional group, for example, oligomers or prepolymers and reactive diluents, for example, relatively low-molecular weight polyester resins, polyether resins, acrylic resins, epoxy resins, urethane resins, alkyd resins, spiroacetal resins, polybutadiene resins, and polythiol polyene resins and (meth)acrylates of polyfunctional compounds such as polyhydric alcohols. Specific examples thereof include monofunctional monomers such as ethyl (meth)acrylate, ethylhexyl (meth)acrylate, styrene, methyl styrene, and N-vinylpyrrolidone, and polyfunctional monomers, for example, polymethylolpropane tri(meth)

acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When ionizing radiation curing resins are used as an ultraviolet curing resin, preferably, a photopolymerization initiator is used. In the case of the radical polymerizable unsaturated group-containing resin system, specific examples of photopolymerization initiators include acetophenones, benzophenones, Michler's benzoyl benzoate, α-amyloxime ester, tetramethyl thiuram monosulfide, thioxanthones, propiophenones, benzyls, benzoins, and acylphosphine oxidos. Preferably, photosensitizers are mixed in the system. Specific examples of photosensitizers include n-butylamine, triethylamine, and poly-n-butylphosphine. On the other hand, in the case of a cation polymerizable functional group-containing resin system, aromatic diazonium salts, aromatic sulfonium salts, aromatic idonium salts, metallocene compounds, benzoinsulfonic esters and the like may be used as a photopolymerization initiator either solely or as a mixture of two or more. The amount of the photopolymerization initiator added is 0.1 to 10 parts by weight based on 100 parts by weight of the ionizing radiation curing composition.

The solvent drying-type resin used as a mixture with the ionizing radiation curing resin is mainly a thermoplastic resin. Commonly exemplified thermoplastic resins are usable. Coating defects of the coated face can be effectively prevented by adding the solvent drying-type resin. Specific examples of preferred thermoplastic resins include styrenic resins, (meth)acrylic resins, vinyl acetate resins, vinyl ether resins, halogen-containing resins, alicyclic olefinic resins, polycarbonate resins, polyester resins, polyamide resins, cellulose derivatives, silicone resins, and rubbers or elastomers. The resin is generally noncrystalline and, at the same time, is soluble in an organic solvent (particularly a common solvent which can dissolve a plurality of polymers and curable compounds). Particularly preferred are resins having good moldability or film forming properties, transparency, and weathering resistance, for example, styrenic resins, (meth)acrylic resins, alicyclic olefinic resins, polyester resins, cellulose derivatives (for example, cellulose esters).

In a preferred embodiment of the present invention, when the light transparent base material is formed of a cellulosic resin such as triacetylcellulose "TAC," specific examples of preferred thermoplastic resins include cellulosic resins, for example, nitrocellulose, acetylcellulose, cellulose acetate propionate, and ethylhydroxyethylcellulose. When the cellulosic resin is used, the adhesion between the light transparent base material and the antistatic layer (if any) and transparency can be improved.

Specific examples of heat curing resin include phenolic resins, urea resins, diallyl phthalate resins, melanin resins, guanamine resins, unsaturated polyester resins, polyurethane resins, epoxy resins, aminoalkyd resins, melamine-urea cocondensed resins, silicone resins, and polysiloxane resins. When the heat curing resin is used, if necessary, for example, curing agents such as crosslinking agents and polymerization initiators, polymerization accelerators, solvents, and viscosity modifiers may be further added.

Leveling Agent

In a preferred embodiment of the present invention, a leveling agent such as a fluorine-type or silicone-type may be added to the composition for an anti-dazzling layer. The composition for an anti-dazzling layer to which the leveling agent has been added can effectively prevent the inhibition of curing of the coating film surface by oxygen in coating or drying, and can impart a scratch resistance. Preferably, the leveling agent is utilized in film-shaped light transparent base material (for example, triacetylcellulose) where heat resistance is required.

Penetrating Solvent

In a preferred embodiment of the present invention, in order to render the interface between the light transparent base material and the anti-dazzling layer absent, preferably, the anti-dazzling layer is formed using a composition, for an anti-dazzling layer, using a solvent penetrable into the light transparent base material (a solvent which can dissolve and/or wet the components constituting the light transparent base material and the components constituting the hard coat layer). In the present invention, the use of the penetrating agent can completely eliminate the interface considered as being formed between the light transparent base material and the anti-dazzling layer. By virtue of the absence of the interface, the occurrence of interference colors as seen in an oil film and interference fringes on the surface of the coating film of the anti-dazzling layer can be prevented. The penetrating solvent used for imparting penetrability to the composition for an anti-dazzling layer is penetrable into the light transparent base material. Accordingly, in the present invention, the term "penetrability" in the penetrating solvent embraces all concepts of penetrating, swelling, wetting and other properties in relation to the light transparent base material. Specific examples of penetrating solvents include alcohols such as isopropyl alcohol, methanol, and ethanol; ketones such as methyl ethyl ketone, methyl isobutyl ketone, and cyclohexanone; esters such as methyl acetate, ethyl acetate, and butyl acetate; halogenated hydrocarbons such as chloroform, methylene chloride, and tetrachloroethane; or their mixtures. Preferred are esters.

Specific examples of penetrating solvents include acetone, methyl acetate, ethyl acetate, butyl acetate, chloroform, methylene chloride, trichloroethane, tetrahydrofuran, methyl ethyl ketone, methyl isobutyl ketone, cyclohexanone, nitromethane, 1,4-dioxane, dioxolane, N-methylpyrrolidone, N,N-dimethylformamide, methanol, ethanol, isopropyl alcohol, butanol, isobutyl alcohol, diisopropyl ether, methylcellosolve, ethylcellosolve, and butylcellosolve. Preferred are methyl acetate, ethyl acetate, butyl acetate, methyl ethyl ketone and the like.

Specific examples of preferred penetrating agents usable in the present invention include ketones such as acetone, methyl ethyl ketone, cyclohexanone, methyl isobutyl ketone, and diacetone alcohol; esters such as methyl formate, methyl acetate, ethyl acetate, butyl acetate, and ethyl lactate; nitrogen-containing compound such as nitromethane, acetonitrile, N-methylpyrrolidone, and N,N-dimethylformamide; glycols such as methyl glycol, and methyl glycol acetate; ethers such as tetrahydrofuran, 1,4-dioxane, dioxolane, and diisopropyl ether; halogenated hydrocarbon such as methylene chloride, chloroform, and tetrachloroethane; glycol ethers such as methyl cellosolve, ethyl cellosolve, butyl cellosolve, and cellosolve acetate; and other solvents such as dimethyl sulfoxide and propylene carbonate; or mixtures thereof. More preferred are, for example, methyl acetate, ethyl acetate, butyl acetate, and methyl ethyl ketone. Other solvents, for example, alcohols such as methanol, ethanol, isopropyl alcohol, butanol, and isobutyl alcohol; and aromatic hydrocarbons such as toluene and xylene may be used as a mixture with the above solvents.

Formation of Anti-Dazzling Layer

The anti-dazzling layer may be formed by mixing fine particles or aggregation-type fine particles (preferably first fine particles and second fine particles) and the resin, if necessary, with a penetrating solvent or a proper solvent to give a composition for an anti-dazzling layer and coating the composition onto a light transparent base material. Suitable solvents usable in this case include toluene, xylene, cyclohexane, ethyl acetate, butyl acetate, propyl acetate, MEK, and MIBK.

Methods usable for coating the composition for an anti-dazzling layer onto the light transparent base material include coating methods such as roll coating, Mayer bar coating, and gravure coating. After coating of the composition for an anti-dazzling layer, the coating is dried and cured by ultraviolet irradiation. Specific examples of ultraviolet sources include light sources, for example, ultra-high-pressure mercury lamps, high-pressure mercury lamps, low-pressure mercury lamps, carbon arc lamps, black light fluorescent lamps, and metal halide lamps. Regarding the wavelength of the ultraviolet light, a wavelength range of 190 to 380 nm may be used. Specific examples of electron beam sources include various electron beam accelerators, for example, Cockcroft-Walton accelerators, van de Graaff accelerators, resonance transformer accelerators, insulated core transformer accelerators, linear accelerators, Dynamitron accelerators, and high-frequency accelerators. The resin is cured, and the fine particles in the resin are fixed to form a desired concavoconvex shape on the outermost surface of the anti-dazzling layer.

2) Anti-Dazzling Layer Formed Using Composition for Anti-Dazzling Layer, Free from Fine Particles and Containing Resin and the Like The anti-dazzling layer may be formed by mixing at least one polymer with at least one curable resin precursor in a proper solvent to prepare a composition for an anti-dazzling layer and applying the composition onto a light transparent base material.

Polymer

The polymer may be a plurality of polymers which can be phase separated by a spinodal decomposition, for example, a cellulose derivative and a styrenic resin, an (meth)acrylic resin, an alicyclic olefinic resin, a polycarbonate resin, a polyester resin or the like, or a combination thereof. The curable resin precursor may be compatible with at least one polymer in the plurality of polymers. At least one of the plurality of polymers may have a functional group involved in a curing reaction of the curable resin precursor, for example, a polymerizable group such as an (meth)acryloyl group. In general, a thermoplastic resin is used as the polymer component.

Specific examples of thermoplastic resins include styrenic resins, (meth)acrylic resins, organic acid vinyl ester resins, vinyl ether resins, halogen-containing resins, olefinic resins (including alicyclic olefinic resins), polycarbonate resins, polyester resins, polyamide resins, thermoplastic polyurethane resins, polysulfone resins (for example, polyethersulfone and polysulfone), polyphenylene ether resins (for example, polymers of 2,6-xylenol), cellulose derivatives (for example, cellulose esters, cellulose carbamates, and cellulose ethers), silicone resins (for example, polydimethylsiloxane and polymethylphenylsiloxane), and rubbers or elastomers (for example, diene rubbers such as polybutadiene and polyisoprene, styrene-butadiene copolymers, acrylonitrile-butadiene copolymers, acrylic rubbers, urethane rubbers, and silicone rubbers). They may be used either solely or in a combination of two or more.

Specific examples of styrenic resins include homopolymers or copolymers of styrenic monomers (for example, polystyrenes, styrene-α-methylstyrene copolymers, and styrene-vinyltoluene copolymers) and copolymers of styrenic monomers with other polymerizable monomers (for example, (meth)acrylic monomers, maleic anhydride, maleimide monomers, or dienes). Styrenic copolymers include, for example, styrene-acrylonitrile copolymers (AS resins), copolymers of styrene with (meth)acrylic monomers (for example, styrene-methyl methacrylate copolymers, styrene-methyl methacrylate-(meth)acrylic ester copolymers, or styrene-methyl methacrylate-(meth)acrylic acid copolymers), and styrene-maleic anhydride copolymers. Preferred styrenic resins include copolymers of polystyrene or styrene with (meth)acrylic monomers (for example, copolymers composed mainly of styrene and methyl methacrylate, for example, styrene-methyl methacrylate copolymers), AS resins, and styrene-butadiene copolymers.

For example, homopolymers or copolymers of (meth)acrylic monomers and copolymers of (meth)acrylic monomers with copolymerizable monomers may be mentioned as the (meth)acrylic resin. Specific examples of (meth)acrylic monomers include (meth)acrylic acid; $C_{1-10}$ alkyl (meth)acrylates such as methyl (meth)acrylate, ethyl (meth)acrylate, butyl (meth)acrylate, t-butyl (meth)acrylate, isobutyl (meth)acrylate, hexyl (meth)acrylate, octyl (meth)acrylate, and 2-ethylhexyl (meth)acrylate; aryl (meth)acrylates such as phenyl (meth)acrylate; hydroxyalkyl (meth)acrylate such as hydroxyethyl (meth)acrylate and hydroxypropyl (meth)acrylate; glycidyl (meth)acrylate; N,N-dialkylaminoalkyl (meth)acrylate; (meth)acrylonitrile; and (meth)acrylates containing an alicyclic hydrocarbon group such as tricyclodecane. Specific examples of copolymerizable monomers include the above styrenic monomers, vinyl ester monomers, maleic anhydride, maleic acid, and fumaric acid. These monomers may be used either solely or in a combination of two or more.

Specific examples of (meth)acrylic resins include poly (meth)acrylic esters such as polymethyl methacrylate, methyl methacrylate-(meth)acrylic acid copolymers, methyl methacrylate-(meth)acrylic ester copolymers, methyl methacrylate-acrylic ester-(meth)acrylic acid copolymers, and (meth)acrylic ester-styrene copolymers (for example, MS resins). Specific examples of preferred (meth)acrylic resins include poly-$C_{1-6}$ alkyl (meth)acrylates such as polymethyl (meth)acrylate. In particular, methyl methacrylate resins composed mainly of methyl methacrylate (approximately 50 to 100% by weight, preferably 70 to 100% by weight) may be mentioned.

Specific examples of organic acid vinyl ester resins include homopolymers or copolymers of vinyl ester monomers (for example, polyvinyl acetate and polyvinyl propionate), copolymers of vinyl ester monomers with copolymerizable monomers (for example, ethylene-vinyl acetate copolymers, vinyl acetate-vinyl chloride copolymers, and vinyl acetate-(meth)acrylic ester copolymers), or their derivatives. Specific examples of vinyl ester resin derivatives include polyvinyl alcohol, ethylene-vinyl alcohol copolymers, and polyvinylacetal resins.

Specific examples of vinyl ether resins include homopolymers or copolymers of vinyl $C_{1-10}$ alkyl ethers such as vinyl methyl ether, vinyl ethyl ether, vinyl propyl ether, or vinyl t-butyl ether, and copolymers of vinyl $C_{1-10}$ alkyl ethers with copolymerizable monomers (for example, vinyl alkyl ether-maleic anhydride copolymers). Specific examples of halogen-containing resins include polyvinyl chloride, polyfluorinated vinylidenes, vinyl chloride-vinyl acetate copolymers, vinyl chloride-(meth)acrylic ester copolymers, and vinylidene chloride-(meth)acrylic ester copolymers.

Specific examples of olefinic resins include homopolymers of olefins such as polyethylene and polypropylene, and copolymers such as ethylene-vinyl acetate copolymers, ethylene-vinyl alcohol copolymers, ethylene-(meth)acrylic acid copolymers, and ethylene-(meth)acrylic ester copolymers.

Specific examples of alicyclic olefinic resins include homopolymers or copolymers of cyclic olefins (for example, norbornene and dicyclopentadiene) (for example, polymers containing an alicyclic hydrocarbon group such as tricyclodecane which is sterically rigid), and copolymers of the above cyclic olefins with copolymerizable monomers (for example, ethylene-norbornene copolymers and propylene-norbornene copolymers). Specific examples of alicyclic olefinic resins include those which are available, for example, under the tradenames "ARTON" and "ZEONEX."

Specific examples of polycarbonate resins include aromatic polycarbonates based on bisphenols (for example, bisphenol A), and aliphatic polycarbonates such as diethylene glycol bisallyl carbonates. Specific examples of polyester resins include aromatic polyesters using aromatic dicarboxylic acids such as terephthalic acid, for example, homopolyesters, for example, poly-$C_{2-4}$-alkylene terephthalates and poly-$C_{2-4}$-alkylene naphthalates including polyethylene terephthalate and polybutylene terephthalate, and copolyesters comprising as a main component (for example, not less than 50% by weight) $C_{2-4}$ alkylene arylate units ($C_{2-4}$ alkylene terephthalate and/or $C_{2-4}$ alkylene naphthalate units). Specific examples of copolyesters include copolyesters in which, in the constituent units of poly-$C_{2-4}$-alkylene arylate, a part of $C_{2-4}$ alkylene glycol has been replaced, for example, with a polyoxy-$C_{2-4}$-alkylene glycol, a $C_{6-10}$ alkylene glycol, an alicyclic diol (for example, cyclohexanedimethanol or hydrogenated bisphenol A), an aromatic ring-containing diol (for example, 9,9-bis(4-(2-hydroxyethoxy)phenyl)fluorene having a fluorenone side chain, bisphenol A, or a bisphenol A-alkylene oxide adduct), and copolyesters in which a part of aromatic dicarboxylic acid has been replaced, for example, with an asymmetric aromatic dicarboxylic acid such as phthalic acid or isophthalic acid, or an aliphatic $C_{6-12}$ dicarboxylic acid such as adipic acid. Specific examples of polyester resins include polyarylate resins, aliphatic polyesters using aliphatic dicarboxylic acids such as adipic acid, and homopolymers and copolymers of lactones such as ε-caprolactone. Preferred polyester resins are generally noncrystalline polyester resins such as noncrystalline copolyesters (for example, $C_{2-4}$ alkylene arylate copolyesters).

Specific examples of polyamide resins include aliphatic polyamides such as nylon 46, nylon 6, nylon 66, nylon 610, nylon 612, nylon 11, and nylon 12, and polyamides produced from dicarboxylic acids (for example, terephthalic acid, isophthalic acid, or adipic acid) and diamines (for example, hexamethylenediamine or metaxylylenediamine). Specific examples of polyamide resins include homopolymers or copolymers of lactams such as ε-caprolactam. The polyamide resins may be either homopolyamides or copolyamides.

Specific examples of cellulose esters among the cellulose derivatives include, for example, aliphatic organic acid esters, for example, cellulose acetates such as cellulose diacetate and cellulose triacetate; and $C_{1-6}$ organic acid esters such as cellulose propionate, cellulose butyrate, cellulose acetate propionate, and cellulose acetate butyrate. Further examples thereof include aromatic organic acid esters ($C_{7-12}$ aromatic carboxylic esters such as cellulose phthalate and cellulose benzoate) and inorganic acid esters, for example, cellulose phosphate and cellulose sulphate. Mixed acid esters such as acetic acid-nitric acid cellulose ester may also be used. Specific examples of cellulose derivatives include cellulose carbamates (for example, cellulose phenylcarbamate) and further include cellulose ethers, for example, cyanoethylcellulose; hydroxy-$C_{2-4}$-alkylcelluloses such as hydroxyethylcellulose and hydroxypropylcellulose; $C_{1-6}$ alkylcelluloses such as methylcellulose and ethylcellulose; and carboxymethylcellulose or its salt, benzylcellulose, and acetylalkylcellulose.

Specific examples of preferred thermoplastic resins include styrenic resins, (meth)acrylic resins, vinyl acetate resins, vinyl ether resins, halogen-containing resins, alicyclic olefinic resins, polycarbonate resins, polyester resins, polyamide resins, cellulose derivatives, silicone resins, and rubbers or elastomers. Resins, which are usually noncrystalline and soluble in organic solvents (particularly common solvents which can dissolve a plurality of polymers or curable compounds). Particularly preferred are, for example, resins having a high level of moldability or film formability, transparency and weathering resistance, for example, styrenic resins, (meth)acrylic resins, alicyclic olefinic resins, polyester resins, and cellulose derivatives (for example, cellulose esters).

Polymers containing a functional group involved in a curing reaction (or a functional group reactive with a curable compound) are also usable as the polymer component. The polymers may contain a functional group in the main chain or side chain. The functional group may be introduced into the main chain, for example, by copolymerization or co-condensation. In general, however, the functional group is introduced into the side chain. Specific examples of such functional groups include condensable groups and reactive groups (for example, hydroxyl group, acid anhydride group, carboxyl group, amino group or imino group, epoxy group, glycidyl group, and isocyanate group), polymerizable groups (for example, $C_{2-6}$ alkenyl groups such as vinyl, propenyl, isopropenyl, butenyl and allyl groups, $C_{2-6}$ alkynyl groups such as ethynyl, propynyl, and butynyl groups, and $C_{2-6}$ alkenylidene groups such as vinylidene), or groups containing these polymerizable groups (for example, (meth)acryloyl group). Among these functional groups, polymerizable groups are preferred.

The polymerizable group may be introduced into the side chain, for example, by reacting a thermoplastic resin containing a functional group such as a reactive group or a condensable group with a polymerizable compound containing a group reactive with the functional group.

Examples of such functional group-containing thermoplastic resins include thermoplastic resins containing a carboxyl group or its acid anhydride group (for example, (meth)acrylic resins, polyester resins, and polyamide resins), hydroxyl group-containing thermoplastic resins (for example, (meth)acrylic resins, polyurethane resins, cellulose derivatives, and polyamide resins), amino group-containing thermoplastic resins (for example, polyamide resins), epoxy group-containing thermoplastic resins (for example, epoxy group-containing (meth)acrylic resins and polyester resins). Resins comprising the above functional group introduced into thermoplastic resins such as styrenic resins, olefinic resins, or alicyclic olefinic resins by copolymerization or graft polymerization are also possible.

Regarding the polymerizable compound, thermoplastic resins containing a carboxyl or acid anhydride group include polymerizable compounds containing epoxy, hydroxyl, amino, or isocyanate groups. Hydroxyl group-containing thermoplastic resins include polymerizable compounds containing carboxyl groups or acid anhydride groups thereof or isocyanate groups. Amino group-containing thermoplastic resins include polymerizable compounds containing carboxyl groups or acid anhydride groups thereof, epoxy groups, and isocyanate groups. Epoxy group-containing thermoplastic resins include polymerizable compounds containing carboxyl groups or acid anhydride groups thereof or amino groups.

Among the above polymerizable compounds, epoxy group-containing polymerizable compounds include, for example, epoxycyclo-$C_{5-8}$-alkenyl (meth)acrylates such as epoxycyclohexenyl (meth)acrylate, glycidyl (meth)acrylate, and allyl glycidyl ether. Hydroxyl group-containing compounds include, for example, hydroxy-$C_{1-4}$-alkyl (meth) acrylates such as hydroxypropyl (meth)acrylate, and $C_{2-6}$ alkylene glycol (meth)acrylates such as ethylene glycol mono (meth)acrylate. Amino group-containing polymerizable compounds include, for example, amino-$C_{1-4}$-alkyl (meth) acrylates such as aminoethyl (meth)acrylate, $C_{3-6}$ alkenylamines such as allylamine, and aminostyrenes such as 4-aminostyrene and diaminostyrene. Isocyanate group-containing polymerizable compounds include, for example, (poly)urethane (meth)acrylate and vinyl isocyanate. Polymerizable compounds containing carboxyl groups or acid anhydride groups thereof include, for example, unsaturated carboxylic acids or anhydrides thereof such as (meth)acrylic acid and maleic anhydride.

A combination of a thermoplastic resin containing a carboxyl group or its acid anhydride group with an epoxy group-containing compound, particularly a combination of an (meth)acrylic resin (for example, an (meth)acrylic acid-(meth)acrylic ester copolymer) with an epoxy group-containing (meth)acrylate (for example, epoxycycloalkenyl (meth) acrylate or glycidyl (meth)acrylate) may be mentioned as a representative example of the polymerizable compound. Specific examples thereof include polymers comprising a polymerizable unsaturated group introduced into a part of carboxyl groups in an (meth)acrylic resin, for example, an (meth)acrylic polymer produced by reacting a part of carboxyl groups in an (meth)acrylic acid-(meth)acrylic ester copolymer with an epoxy group in 3,4-epoxycyclohexenylmethyl acrylate to introduce a photopolymerizable unsaturated group into the side chain (CYCLOMER P, manufactured by Daicel Chemical Industries, Ltd.).

The amount of the functional group (particularly polymerizable group) involved in a curing reaction with the thermoplastic resin introduced is approximately 0.001 to 10 moles, preferably 0.01 to 5 moles, more preferably 0.02 to 3 moles based on 1 kg of the thermoplastic resin.

These polymers may be used in a suitable combination. Specifically, the polymer may comprise a plurality of polymers. The plurality of polymers may be phase separated by liquid phase spinodal decomposition. The plurality of polymers may be incompatible with each other. When the plurality of polymers are used in combination, the combination of a first resin with a second resin is not particularly limited. For example, a plurality of polymers incompatible with each other at a temperature around a processing temperature, for example, two suitable polymers incompatible with each other may be used. For example, when the first resin is a styrenic resin (for example, polystyrene or a styrene-acrylonitrile copolymer), examples of second resins usable herein include cellulose derivatives (for example, cellulose esters such as cellulose acetate propionate), (meth)acrylic resins (for example, polymethyl methacrylate), alicyclic olefinic resins (for example, polymers using norbornene as a monomer), polycarbonate resins, and polyester resins (for example, the above poly-$C_{2-4}$-alkylene arylate copolyesters). On the other hand, for example, when the first polymer is a cellulose derivative (for example, a cellulose ester such as cellulose acetate propionate), examples of second polymers usable herein include styrenic resins (for example, polystyrene or styrene-acrylonitrile copolymer), (meth)acrylic resins, alicyclic olefinic resins (for example, polymers using norbornene as a monomer), polycarbonate resins, and polyester resins (for example, the above poly-$C_{2-4}$-alkylene arylate copolyester). In the combination of the plurality of resins, at least cellulose esters (for example, cellulose $C_{2-4}$ alkyl carboxylic esters such as cellulose diacetate, cellulose triacetate, cellulose acetate propionate, or cellulose acetate butyrate) may be used.

The phase separated structure produced by the spinodal decomposition is finally cured by the application of an actinic radiation (for example, ultraviolet light or electron beam) or heat to form a cured resin. By virtue of this, the scratch resistance can be imparted to the anti-dazzling layer, and the durability can be improved.

From the viewpoint of scratch resistance after curing, preferably, at least one polymer in the plurality of polymers, for example, one of mutually incompatible polymers (when the first and second resins are used in combination, particularly both the polymers) is a polymer having on its side chain a functional group reactive with a curable resin precursor. The weight ratio between the first polymer and the second polymer may be selected, for example, from a range of first polymer/second polymer=approximately 1/99 to 99/1, preferably 5/95 to 95/5, more preferably 10/90 to 90/10 and is generally approximately 20/80 to 80/20, particularly 30/70 to 70/30.

Regarding the polymer for phase separated structure formation, in addition to the above two incompatible polymers, the above thermoplastic resins or other polymers may be incorporated.

The glass transition temperature of the polymer may be selected, for example, from a range of approximately −100° C. to 250° C., preferably −50° C. to 230° C., more preferably 0 to 200° C. (for example, approximately 50 to 180° C.). A glass transition temperature of 50° C. or above (for example, approximately 70 to 200° C.), preferably 100° C. or above (for example, approximately 100 to 170° C.), is advantageous from the viewpoint of the surface hardness. The weight average molecular weight of the polymer may be selected, for example, from a range of approximately not more than 1,000,000, preferably 1,000 to 500,000.

Curable Resin Precursor

The curable resin precursor is a compound containing a functional group which can be reacted upon exposure to heat or an actinic radiation (for example, ultraviolet light or electron beams) or the like, and various curable compounds, which can be cured or crosslinked upon exposure to heat, an actinic radiation or the like to form a resin (particularly a cured or crosslinked resin), can be used. Examples of such resin precursors include heat curing compounds or resins [low-molecular weight compounds containing epoxy groups, polymerizable groups, isocyanate groups, alkoxysilyl groups, or silanol groups (for example, epoxy resins, unsaturated polyester resins, urethane resins, or silicone resins)], and photocuring compounds curable upon exposure to an actinic radiation (for example, ultraviolet light) (for example, ultraviolet light curing compounds such as photocuring monomers and oligomers). The photocuring compound may be, for example, an EB (electron beam) curing compound. Photocuring compounds such as photocuring monomers, oligomers, photocuring resins which may have a low-molecular weight, are sometimes referred to simply as "photocuring resin."

Photocuring compounds include, for example, monomers and oligomers (or resins, particularly low-molecular weight resins). Monomers include, for example, monofunctional monomers [for example, (meth)acrylic monomers such as (meth)acrylic esters, vinyl monomers such as vinylpyrrolidone, and crosslinked ring-type hydrocarbon group-containing (meth)acrylates such as isobornyl (meth)acrylate or adamantyl (meth)acrylate)], polyfunctional monomers containing at least two polymerizable unsaturated bonds [for example, alkylene glycol di(meth)acrylates such as ethylene glycol di(meth)acrylate, propylene glycol di(meth)acrylate, butanediol di(meth)acrylate, neopentyl glycol di(meth)acrylate, and hexanediol di(meth)acrylate; (poly)oxyalkylene glycol di(meth)acrylates such as diethylene glycol di(meth)acrylate, dipropylene glycol di(meth)acrylate, and polyoxytetramethylene glycol di(meth)acrylate; crosslinked ring-type hydrocarbon group-containing di(meth)acrylates such as tricyclodecane dimethanol di(meth)acrylate and adamantane di(meth)acrylate; and polyfunctional monomers containing about three to six polymerizable unsaturated bonds such as trimethylolpropane tri(meth)acrylate, trimethylolethane tri(meth)acrylate, pentaerythritol tri(meth)acrylate, pentaerythritol tetra(meth)acrylate, and dipentaerythritol penta(meth)acrylate].

Oligomers or resins include (meth)acrylate or epoxy (meth)acrylate of bisphenol A-alkylene oxide adducts (for example, bisphenol A-type epoxy (meth)acrylate and novolak-type epoxy (meth)acrylate), polyester (meth)acrylates (for example, aliphatic polyester-type (meth)acrylate and aromatic polyester-type (meth)acrylate), (poly)urethane (meth)acrylate (for example, polyester-type urethane (meth) acrylate, polyether-type urethane (meth)acrylate), and silicone (meth)acrylate. These photocuring compounds are usable either solely or in a combination of two or more.

Preferred curable resin precursors include photocuring compounds curable in a short time, for example, ultraviolet light curing compounds (for example, monomers, oligomers and resins which may have a low-molecular weight), and EB curing compounds. Resin precursors which are particularly advantageous from the practical viewpoint are ultraviolet light curing resins. From the viewpoint of improving resistance such as scratch resistance, preferably, the photocuring resin is a compound having in its molecule two or more (preferably approximately 2 to 6, more preferably 2 to 4) polymerizable unsaturated bonds. The molecular weight of the curable resin precursor is approximately not more than 5000, preferably not more than 2000, more preferably not more than 1000, from the viewpoint of compatibility with the polymer.

The curable resin precursor may contain a curing agent depending upon the type of the curable resin precursor. For example, in the case of heat curing resins, curing agents such as amines or polycarboxylic acids may be contained, and, in the case of photocuring resins, photopolymerization initiators may be contained. Examples of photopolymerization initiators include commonly used components, for example, acetophenones or propiophenones, benzyls, benzoins, benzophenones, thioxanthones, and acylphosphine oxides. The content of the curing agent such as a photocuring agent is approximately 0.1 to 20 parts by weight, preferably 0.5 to 10 parts by weight, more preferably 1 to 8 parts by weight (particularly 1 to 5 parts by weight), based on 100 parts by weight of the curable resin precursor and may be approximately 3 to 8 parts by weight.

The curable resin precursor may contain a curing accelerator. For example, the photocuring resin may contain photocuring accelerators, for example, tertiary amines (for example, dialkylaminobenzoic esters) and phosphine photopolymerization accelerators.

Specific Combination of Polymer with Curable Resin Precursor

At least two components in at least one polymer and at least one curable resin precursor may be used in a combination of materials which are mutually phase separated at a temperature around the processing temperature. Examples of such combinations include (a) a combination of a plurality of polymers which are mutually incompatible and phase separated, (b) a combination of a polymer and a curable resin precursor which are mutually incompatible and phase separated, and (c) a combination of a plurality of curable resin precursors which are mutually incompatible and phase separated. Among these combinations, (a) a combination of a plurality of polymers and (b) a combination of a polymer with a curable resin precursor are generally preferred, and particularly (a) a combination of a plurality of polymers is preferred. When the compatibility of both the materials to be phase separated is low, both the materials are effectively phase separated in the course of drying for evaporating the solvent and the function as an anti-dazzling layer can be improved.

The thermoplastic resin and the curable resin precursor (or curing resin) are generally incompatible with each other. When the polymer and the curable resin precursor are incompatible with each other and phase separated, a plurality of polymers may be used as the polymer. When a plurality of polymers are used, meeting the requirement that at least one polymer is incompatible with the resin precursor (or curing resin) suffices for contemplated results, and the other polymer(s) may be compatible with the resin precursor.

A combination of two mutually incompatible thermoplastic resins with a curing compound (particularly a monomer or oligomer containing a plurality of curable functional groups) may be adopted. From the viewpoint of scratch resistance after curing, one polymer (particularly both polymers) in the incompatible thermoplastic resins may be a thermoplastic resin containing a functional group involved in the curing reaction (a functional group involved in curing of the curable resin precursor).

When a combination of a plurality of mutually incompatible polymers is adopted for phase separation, the curable resin precursor to be used in combination with the plurality of mutually incompatible polymers is compatible with at least one polymer in the plurality of incompatible polymers at a temperature around the processing temperature. Specifically, for example, when the plurality of mutually incompatible polymers are constituted by the first resin and the second resin, the curable resin precursor may be one which is compatible with at least one of the first resin and the second resin, preferably is compatible with both the polymer components. When the curable resin precursor is compatible with both the polymer components, phase separation occurs into at least two phases, i.e., a mixture composed mainly of a first resin and a curable resin precursor and a mixture composed mainly of a second resin and a curable resin precursor.

When the compatibility of a plurality of selected polymers is low, the polymers are effectively phase separated from each other in the course of drying for evaporating the solvent and the function as an anti-dazzling layer is improved. The phase separability of the plurality of polymers can be simply determined by a method in which a homogeneous solution is prepared using a good solvent for both the components and the solvent is gradually evaporated to visually inspect whether or not the residual solid matter is opaque in the course of evaporation.

In general, the polymer and the cured or crosslinked resin produced by curing of the resin precursor are different from each other in refractive index. Further, the plurality of polymers (first and second resins) are also different from each other in refractive index. The difference in refractive index between the polymer and the cured or crosslinked resin, and the difference in refractive index between the plurality of polymers (first and second resins) may be, for example, approximately 0.001 to 0.2, preferably 0.05 to 0.15.

The weight ratio between the polymer and the curable resin precursor is not particularly limited and may be selected, for example, from a range of polymer/curable resin precursor=approximately 5/95 to 95/5, and, from the viewpoint of surface hardness, is preferably polymer/curable resin precursor=approximately 5/95 to 60/40, more preferably 10/90 to 50/50, particularly preferably 10/90 to 40/60.

Solvent

The solvent may be selected and used according to the type and solubility of the polymer and curable resin precursor. A solvent capable of homogeneously dissolving at least the solid matter (a plurality of polymers and curable resin precursor, a reaction initiator, and other additives) suffices for contemplated results and may be used in wet spinodal decomposition. Examples of such solvents include ketones (for example, acetone, methyl ethyl ketone, methyl isobutyl ketone, and cyclohexanone), ethers (for example, dioxane and tetrahydrofuran), aliphatic hydrocarbons (for example, hexane), alicyclic hydrocarbons (for example, cyclohexane), aromatic hydrocarbons (for example, toluene and xylene), halogenated hydrocarbons (for example, dichloromethane and dichloroethane), esters (for example, methyl acetate, ethyl acetate and butyl acetate), water, alcohols (for example, ethanol, isopropanol, butanol, and cyclohexanol), cellosolves (for example, methylcellosolve and ethylcellosolve), cellosolve acetates, sulfoxides (for example, dimethylsulfoxide), and amides (for example, dimethylformamide and dimethylacetamide). A mixture solvents composed of two or more of these solvents may be used.

The concentration of the solute (polymer and curable resin precursor, reaction initiator, and other additives) in the composition for an anti-dazzling layer may be selected from such a range that causes phase separation and such a range that castability, coatability and the like are not deteriorated. The solute concentration is, for example, approximately 1 to 80% by weight, preferably 5 to 60% by weight, more preferably 15 to 40% by weight (particularly 20 to 40% by weight).

Penetrating Solvent

In a preferred embodiment of the present invention, in order to render the interface between the light transparent base material and the anti-dazzling layer absent, preferably, the anti-dazzling layer is formed using a composition for an anti-dazzling layer, which is penetrable into the light transparent base material. The details of the penetrating solvent may be the same as those described above in "1) Anti-dazzling layer formed using composition for anti-dazzling layer comprising fine particles added to resin."

Method for Anti-Dazzling Layer Formation

The anti-dazzling layer may be formed using a composition for an anti-dazzling layer, comprising at least one polymer and at least one curable resin precursor. The use of a composition for an anti-dazzling layer prepared by mixing at least one polymer and at least one curable resin precursor with, if necessary, a penetrating solvent, and a suitable solvent is advantageous in that at least an anti-dazzling layer can be formed by forming a phase separated structure by spinodal decomposition from a liquid phase and curing the curable resin precursor.

The spinodal decomposition from the liquid phase can be carried out by evaporating the solvent. The combination of materials which can form a phase separated structure may be, for example, a combination of a plurality of polymers, a combination of a polymer and a curable resin precursor, or a combination of a plurality of curable resin precursors. In this method, an anti-dazzling layer may also be formed by subjecting a composition comprising a thermoplastic resin, a photocuring compound (for example, a photopolymerizable monomer or oligomer), a photopolymerization initiator, and a solvent capable of dissolving the thermoplastic resin and photocurable compound (a common solvent) to spinodal decomposition to form a phase separated structure and exposing the product to light. Alternatively, the anti-dazzling layer may be formed by subjecting a composition comprising a thermoplastic resin, a resin incompatible with the thermoplastic resin and containing a photocurable group, a photocuring compound, a photopolymerization initiator, and a solvent capable of dissolving the resin and the photocuring compound to spinodal decomposition to form a phase separated structure, and applying light to the assembly. In these methods, at least one anti-dazzling layer may be formed on a light transparent base material.

Specific Formation Method

The anti-dazzling layer may be formed by a process comprising the steps of: mixing at least one polymer and at least one curing resin precursor using a proper solvent to prepare a composition for an anti-dazzling layer, applying the composition for an anti-dazzling layer onto a light transparent base material and then subjecting the coating to spinodal decomposition involving the evaporation of the solvent to form a phase separated structure; and curing the curable resin precursor to form at least an anti-dazzling layer. The phase separation step generally comprises the step of coating or casting a mixed liquid containing a polymer and a curable resin precursor and a solvent (particularly a liquid composition such as a homogeneous solution) onto the surface of a light transparent base material and the step of evaporating the solvent from the coating layer or casting layer to form a phase separated structure having a regular or periodical average phase-to-phase distance. The anti-dazzling layer can be formed by curing the curable resin precursor.

In a preferred embodiment of the present invention, the mixed liquid may be a composition for an anti-dazzling layer, comprising a thermoplastic resin, a photocuring compound, a photopolymerization initiator, and a solvent capable of dissolving the thermoplastic resin and photocuring compound. The anti-dazzling layer is formed by applying light to photocurable components in the phase separated structure formed by the spinodal decomposition to cure the photocurable components. In another preferred embodiment of the present invention, the mixed liquid may be a composition for an anti-dazzling layer, comprising a plurality of mutually incompatible polymers, a photocuring compound, a photopolymerization initiator, and a solvent. In this case, the anti-dazzling layer is formed by applying light to photocurable components in the phase separated structure formed by the spinodal decomposition to cure the photocurable components.

The spinodal decomposition involving the evaporation of the solvent can impart regularity or periodicity to the average distance between domains in the phase separated structure. The phase separated structure formed by the spinodal decomposition can be immediately fixed by curing the curable resin precursor. The curable resin precursor can be cured, for example, by heating or light irradiation or a combination of these methods according to the type of the curable resin precursor. The heating temperature can be selected from a suitable temperature range, for example, from a range of approximately 50 to 150° C., so far as the phase separated structure is present, and may be selected from the same temperature range as in the phase separation step.

The anti-dazzling layer constituting a part of the optical laminate is formed by forming a phase separated structure in the anti-dazzling layer by spinodal decomposition (wet spinodal decomposition) from a liquid phase. Specifically, a composition for an anti-dazzling layer according to the present invention, comprising a polymer, a curable resin precursor, and a solvent is provided. The solvent is evaporated or removed from the composition for an anti-dazzling layer in its liquid phase (or a homogeneous solution or coating layer thereof) by drying or the like. In the course of drying or the like, an increase in concentration causes phase separation by spinodal decomposition to form a phase separated structure having a relatively regular phase-to-phase distance. More specifically, the wet spinodal decomposition is generally carried out by coating a composition for an anti-dazzling layer (preferably a homogeneous solution) comprising at least one polymer, at least one curable resin precursor, and a solvent onto a support and evaporating the solvent from the coating layer.

In the present invention, in the spinodal decomposition, as the phase separation proceeds, a co-continuous phase structure is formed. As the phase separation further proceeds, the continuous phase is rendered discontinuous by the surface tension of the phase per se to form a liquid droplet phase structure (a sea-island structure of spherical, truly spherical, disk-like, elliptical or other independent phases). Accordingly, depending upon the degree of the phase separation, a structure intermediate between a co-continuous phase structure and a liquid droplet phase structure (a phase structure in the course of transfer from the co-continuous phase to the liquid droplet phase) can also be formed. The phase separated structure of the anti-dazzling layer according to the present invention may be a sea-island structure (a liquid droplet phase structure or a phase structure in which one of the phases is independent or isolated), a co-continuous phase structure (or a network structure), or an intermediate structure in which a co-continuous phase structure and a liquid droplet phase structure exist together. By virtue of the phase separated structure, after the removal of the solvent by drying, fine concavoconvexes can be formed on the surface of the anti-dazzling layer.

In the phase separated structure, concavoconvexes are formed on the surface of the anti-dazzling layer, and, from the viewpoint of enhancing the surface hardness, a liquid droplet phase structure having at least island domains is advantageous. When the phase separated structure composed of the polymer and the precursor (or curable resin) is a sea-island structure, the polymer component may constitutes a sea phase. From the viewpoint of the surface hardness, however, the polymer component preferably constitutes island domains. The formation of island domains leads to the formation of a concavoconvex shape having desired optical characteristics on the surface of the anti-dazzling layer after drying.

The average distance between domains in the phase separated structure is generally substantially regular or periodical. For example, the average phase-to-phase distance of domains may be, for example, approximately 1 to 70 µm (for example, 1 to 40 µm), preferably 2 to 50 µm (for example, 3 to 30 µm), more preferably 5 to 20 µm (for example, 10 to 20 µm).

3) Anti-Dazzling Layer Formed by Treatment for Imparting Concavoconvex Shape 3-1) The anti-dazzling layer according to the present invention may also be an anti-dazzling layer having concavoconvexes formed by forming an anti-dazzling layer and then subjecting the surface of the anti-dazzling layer to embossing treatment for imparting concavoconvexes. For example, a construction may be adopted in which an anti-dazzling layer is provided on a light transparent base material and concavoconvexes are provided on the surface of the anti-dazzling layer. In a preferred embodiment of the present invention, the formation of concavoconvexes on the surface of the anti-dazzling layer is carried out by embossing treatment using a mold having a concavoconvex shape which is reverse to the concavoconvex shape in the anti-dazzling layer. Molds having a reverse concavoconvex shape include emboss plates and emboss rolls. These details may be the same as those in 3-2) which will be described later.

3-2) The anti-dazzling layer according to the present invention may be an anti-dazzling layer having a desired concavoconvex shape formed by adopting a combination of a light transparent base material, a mold having a surface with a concavoconvex shape which is reverse to the concavoconvex shape to be formed on the surface of the anti-dazzling layer, and a composition for an anti-dazzling layer, more specifically by applying a composition for an anti-dazzling layer either as such in combination with a light transparent base material or in the form of a layer stacked on a light transparent base material onto a mold having a surface with a concavoconvex shape which is reverse to the concavoconvex shape to be formed on the surface of the anti-dazzling layer. In this formation method, an optical laminate comprising an anti-dazzling layer having a desired concavoconvex shape can be advantageously produced without the need to incorporate fine particles. The optical laminate can be produced by providing a mold having a surface with a concavoconvex shape which is reverse to the desired concavoconvex shape to be formed on the surface of the anti-dazzling layer, applying a composition for an anti-dazzling layer having a high level of curability onto a light transparent base material either before embossing with the mold or simultaneously with embossing with the mold, curing the coating to integrate the formed anti-dazzling layer having a concavoconvex shape with the light transparent base material. In the present invention, a method may be adopted in which a composition for an anti-dazzling layer is first applied followed by embossing with a mold having a concavoconvex mold shape. Alternatively, a method may also be adopted in which a composition for an anti-dazzling layer is supplied to the interface of a light transparent base material and a mold having a concavoconvex shape to allow the composition for an anti-dazzling layer to be interposed between the mold having a concavoconvex shape and the light transparent base material and to the formation of the concavoconvex shape and the formation of the anti-dazzling layer simultaneously. In a preferred embodiment of the present invention, in addition to the emboss roller, a flat emboss plate may also be used.

The mold surface having a concavoconvex shape formed, for example, in an emboss roller or a flat emboss plate may be formed by various methods, specifically by a sandblasting method or a bead shot method. The anti-dazzling layer formed using an emboss plate (an emboss roller) formed by the sandblast method has such a shape that a number of concaves (on the other hand, downward convexed cross section) are distributed on the upper side. On the other hand, the anti-dazzling layer formed using an emboss plate (an emboss roller) formed by the bead shot method has such a shape that a number of convexes (on the other hand, upward convexed cross section) are distributed on the upper side.

When the average roughness of concavoconvexes formed on the surface of the anti-dazzling layer is identical, the anti-dazzling layer in which a number of convexes are distributed on its upper side is regarded as having a lower haze value and causing a lower level of reflection of a lighting equipment in a room or the like as compared with the anti-dazzling layer in which a number of concaves are distributed on its upper side.

Accordingly, in a preferred embodiment of the present invention, the concavoconvex shape of the anti-dazzling layer is formed by utilizing a concavoconvex mold having a shape identical to the concavoconvex shape of the anti-dazzling layer by a bead shot method. The concavoconvex shape formed by this concavoconvex mold is such that the proportion of the upward convex cross-sectional shape part is larger than that of the downward convex cross-sectional shape part. In another preferred embodiment of the present invention, the concavoconvex shape of the anti-dazzling layer is formed by utilizing a concavoconvex mold having a shape, which is reverse to the concavoconvex shape of the anti-dazzling layer, formed by the bead shot method. The concavoconvex shape formed by this concavoconvex mold is such that the proportion of the downward convex cross-sectional shape (that is, concave) part is larger than that of the upward convex cross-sectional shape (that is, convex) part.

Mold materials for forming the concavoconvex mold face usable herein include metals, plastics, woods, or composites thereof. Example of preferred mold materials in the present invention are chromium as a metal from the viewpoints of strength and abrasion resistance upon repeated use, and are iron emboss plates (emboss rollers) having a surface plated with chromium, for example, from the viewpoints of cost effectiveness.

Specific examples of particles (beads) sprayed in the formation of the concavoconvex mold by the sandblast or bead shot method include inorganic particles such as metal particles, silica, alumina, or glass. The particle diameter of these particles is preferably about 100 μm to 300 μm. In spraying these particles against the mold material, a method may be adopted in which these particles, together with a high speed gas, are sprayed. In this case, a proper liquid, for example, water or the like may be used in combination with the particles. In the present invention, preferably, the concavoconvex mold having a concavoconvex shape is plated with chromium or the like to improve the durability during use of the mold and is preferred from the viewpoints of film hardening and corrosion prevention.

Thin Layer

In a preferred embodiment of the present invention, there is provided an optical laminate comprising a thin layer provided between a light transparent base material and an anti-dazzling layer, the interface between the light transparent base material and the anti-dazzling layer having been rendered absent by the presence of the thin layer. This thin layer has been formed using a composition comprising a resin having a weight average molecular weight of not less than 200 and not more than 1000 and containing one or two functional groups, and a penetrating solvent. In the present invention, the "thin layer" embraces concepts of thin films, thin coating films and the like. In a preferred embodiment of the present invention, the thickness of the thin layer is not less than 0.001 μm and not more than 50 μm. Preferably, the lower limit of the layer thickness is 0.01 μm, and the upper limit of the layer thickness is 20 μm.

1) Resin

The resin for use in the thin layer formation has a weight average molecular weight of not less than 200 and not more than 1000. Preferably, the lower limit of the weight average molecular weight is 220, and the upper limit of the weight average molecular weight is 900. Specific examples of such resins include acrylic resins, polyester resins, polyolefin resins, polycarbonate resins, polyamide resins, polyether resins, epoxy resins, urethane resins, alkyd resins, spiroacetal resins, polybutadiene resins, polythiol polyether resins, polyhydric alcohols, and (meth)acrylate resins such as ethylene glycol (meth)acrylate and pentaerythritol (meth)acrylate monostearate. These resins may be used either solely or as a mixture of two or more. Preferred are urethane resins.

Specific examples of such resins include ethylene glycol diacrylate, triethylene glycol diacrylate, propylene glycol diacrylate, neopentyl glycol diacrylate, 1,6-hexanediol diacrylate, triethylene glycol diacrylate or other compounds, acrylic esters such as dipropylene glycol diacrylate, tripropylene glycol diacrylate, 1,4-butanediol diacrylate, isocyanuric acid EO-modified diacrylate, bisphenol FEO-modified diacrylate, bisphenol AEO-modified diacrylate, 3-methylpentanediol di(meth)acrylate, poly-1,2-butadiene di(meth)acrylate, 3-methylpentanediol diacrylate, diethylene glycol bis-β-acryloyloxy propionate, hydroxypivalic ester neopentyl glycol diacrylate, bisphenol A diglycidyl ether acrylate, N-vinylpyrrolidone, ethylacrylate, and propylacrylate, methacrylic esters such as ethyl methacrylate, propyl methacrylate, isopropyl methacrylate, butyl methacrylate, hexyl methacrylate, isooctyl methacrylate, 2-hydroxyethyl methacrylate, cyclohexyl methacrylate, and nonylphenyl methacrylate, tetrafurfuryl methacrylate and its derivatives such as caprolactone-modified products thereof, styrene, α-methylstyrene, acrylic acid, and their mixtures.

The resin contains one or two functional groups, and specific examples of such "functional groups" include (meth)acrylate-type functional groups and hydroxyl, carboxyl, epoxy, amino, vinyl, and alkoxy groups, and their mixtures. Preferred are (meth)acrylate-type functional groups.

2) Penetrating Solvents

In forming the thin layer, the resin may be used as a mixture with a penetrating agent. In the present invention, the penetrating agent mainly refers to a solvent which can swell (dissolve) the light transparent base material. Further, the penetrating solvent may be a solvent which is penetrable into a hard coat layer. The penetrating solvent can effectively prevent interference fringes of the optical laminate.

Specific examples of penetrating solvents include alcohols such as methanol, ethanol, isopropyl alcohol, butanol, isobutyl alcohol, methyl glycol, methyl glycol acetate, methyl cellosolve, ethyl cellosolve, and butyl cellosolve; ketones such as acetone, methyl ethyl ketone, methyl isobutyl ketone, cyclohexanone, and diacetone alcohol; esters such as methyl formate, methyl acetate, ethyl acetate, ethyl lactate, and butyl acetate; nitrogen-containing compounds such as nitromethane, N-methylpyrrolidone, and N,N-dimethylformamide; ethers such as diisopropyl ether, tetrahydrofuran, dioxane, and dioxolane; halogenated hydrocarbons such as methylene chloride, chloroform, trichloroethane, and tetrachloroethane; other compounds such as dimethylsulfoxide or propylene carbonate; or their mixtures. More preferred penetrating solvents include methyl acetate, ethyl acetate, butyl acetate, and methyl ethyl ketone. Specific examples of preferred penetrating solvents in the present invention include ketones such as acetone, methyl ethyl ketone, cyclohexanone, methyl isobutyl ketone, and diacetone alcohol; esters such as methyl formate, methyl acetate, ethyl acetate, butyl acetate, and ethyl lactate; nitrogen-containing compound such as nitromethane, acetonitrile, N-methylpyrrolidone, and N,N-dimethylformamide; glycols such as methyl glycol, and methyl glycol acetate; ethers such as tetrahydrofuran, 1,4-dioxane, dioxolane, and diisopropyl ether; halogenated hydrocarbon such as methylene chloride, chloroform, and tetrachloroethane; glycol ethers such as methyl cellosolve, ethyl cellosolve, butyl cellosolve, and cellosolve acetate; and other solvents such as dimethyl sulfoxide and propylene carbonate; or mixtures thereof. Preferred are, for example, esters and ketones, for example, methyl acetate, ethyl acetate, butyl acetate, and methyl ethyl ketone. Specific examples of other penetrating agents include alcohols such as methanol, ethanol, isopropyl alcohol, butanol, and isobutyl alcohol; and aromatic hydrocarbons such as toluene and xylene may be used. They may be used either solely or as a mixture with the above penetrating solvents.

2. Optical Property Layers

The optical laminate according to the present invention comprises a light transparent base material, an anti-dazzling layer, and optionally a thin layer. The optical laminate may further comprise the following layers provided for improving the optical properties of the optical laminate.

1) Surface Modifying Layer

In the present invention, the surface modifying layer may be formed to modify the concavoconvex surface of the anti-dazzling layer. In this case, the surface modifying layer is integrated with the anti-dazzling layer to exhibit an anti-dazzling function. Accordingly, when the surface modifying layer is formed, optical property values such as Sm, θa, and Rz which are values regarding the concavoconvex shape on the surface of the surface modifying layer fall within the respective ranges specified in the present invention. In addition, when the surface modifying layer is applied onto the anti-dazzling layer, the concavoconvex shape of the surface of the surface modifying layer of course conforms to the optical property values of the concavoconvex shape of the surface of the anti-dazzling layer according to the present invention. This can also be understood from the details of the surface modifying layer and working Examples which will be described later. In the surface modifying layer, fine concavoconvexes present along the concavoconvex shape on the scale of one-tenth or less of the concavo-convex scale (convex (or profile) peak height of concavoconvexes and spacing between convex (or profile) peaks) in the surface roughness in the concavoconvex shape of the anti-dazzling layer can be sealed for smoothing to form smooth concavoconvexes, or the spacing between convex (or profile) peaks of the concavoconvexes and peak profile height, and the frequency (number) of the convex (or profile) peaks can be regulated. The surface modifying layer can be formed, for example, for imparting antistatic properties, refractive index regulation, hardness enhancement, and contamination preventive properties.

The thickness (on a cured state bases) of the surface modifying layer is not less than 1.0 μm and not more than 20 μm (preferably not more than 12 μm). Preferably, the lower limit of the thickness of the surface modifying layer is 3 μm, and the upper limit of the thickness of the surface modifying layer is 8 μm. In the present invention, when the surface modifying layer is formed on the anti-dazzling layer, the total thickness H'μ of the anti-dazzling layer and the surface modifying layer is not less than 4 μm and not more than 27 μm. Preferably, the lower limit of the total thickness is 7 μm, and the upper limit of the total thickness is 23 μm. In a preferred embodiment of the present invention, the value obtained by subtracting the average particle diameter R μm of the fine particles from the thickness H' μm of the anti-dazzling layer, "H'−R," is not less than 0.3 μm and not more than 20 μm. Preferably, the lower limit of the "H'−R" value is 0.5 μm, more preferably 1.0 μm, and the upper limit of the "H'−R" value is 18 μm, more preferably 6 μm.

Surface Modifying Agent

One material or a mixture of two or more materials selected from the group consisting of antistatic agents, refractive index regulating agents, contamination preventive agents, water repellents, oil repellents, fingerprint adhesion preventive agents, curability enhancing agents, hardness regulating agents and the like may be mentioned as the surface modifying agent.

Antistatic Agent (Electroconductive Agent)

When an antistatic agent is contained in the surface modifying layer, dust adhesion to the surface of the optical laminate can be effectively prevented. Specific examples of antistatic agents include cationic group-containing various cationic compounds such as quaternary ammonium salts, pyridinium salts, primary, secondary and tertiary amino groups, anionic group-containing anionic compounds such as sulfonic acid bases, sulfuric ester bases, phosphoric ester bases, and phosphonic acid bases, amphoteric compounds such as amino acid and aminosulfuric ester compounds, nonionic compounds such as amino alcohol, glycerin and polyethylene glycol compounds, organometallic compounds such as alkoxides of tin and titanium, and metal chelate compounds such as their acetylacetonate salts. Further, compounds produced by increasing the molecular weight of the above compounds may also be mentioned. Further, polymerizable compounds, for example, monomers or oligomers, which contain a tertiary amino group, a quaternary ammonium group, or a metal chelate moiety and are polymerizable upon exposure to ionizing radiations, or organometallic compounds such as functional group-containing coupling agents may also be used as the antistatic agent. Electroconductive polymers may be mentioned as the antistatic agent, and specific examples thereof include aliphatic conjugated polyacetylenes, aromatic conjugated poly(paraphenylenes), heterocyclic conjugated polypyrroles, polythiophenes, heteroatom-containing conjugated polyanilines, and mixture-type conjugated poly(phenylenevinylenes). Additional examples of electroconductive polymers include double-chain conjugated systems which are conjugated systems having a plurality of conjugated chains in the molecule thereof, and electroconductive composites which are polymers prepared by grafting or block-copolymerizing the above conjugated polymer chain onto a saturated polymer.

Further, electroconductive ultrafine particles may be mentioned as the antistatic agent. Specific examples of electroconductive ultrafine particles include ultrafine particles of metal oxides. Such metal oxides include ZnO (refractive index 1.90; the numerical value within the parentheses being refractive index; the same shall apply hereinafter), $CeO_2$ (1.95), $Sb_2O_2$ (1.71), $SnO_2$ (1.997), indium tin oxide often abbreviated to "ITO" (1.95), $In_2O_3$ (2.00), $Al_2O_3$ (1.63), antimony-doped tin oxide (abbreviated to "ATO," 2.0), and aluminum-doped zinc oxide (abbreviated to "AZO," 2.0). The term "fine particles" refers to fine particles having a size of not more than 1 micrometer, that is, fine particles of submicron size, preferably fine particles having an average particle diameter of 0.1 nm to 0.1 μm.

In a preferred embodiment of the present invention, the addition amount ratio between the resin and antistatic agent contained in the surface modifying layer is not less than 5 and not more than 25. Preferably, the upper limit of the addition amount ratio is 20, and the lower limit of the addition amount ratio is 5.

Refractive Index Regulating Agent

The refractive index regulating agent may be added to the surface modifying layer to regulate the optical properties of the optical laminate. Examples of such refractive index regulating agents include lower-refractive index agents, medium-refractive index agents, and higher-refractive index agents.

1) Lower-Refractive Index Agent

The lower-refractive index agent has a lower refractive index than the anti-dazzling layer. In a preferred embodiment of the present invention, the anti-dazzling layer has a refractive index of not less than 1.5, and the lower-refractive index agent has a refractive index of less than 1.5, preferably not more than 1.45.

A specific example of a preferred lower-refractive index agent is a fluorine-containing compound curable upon exposure to heat or an ionizing radiation. The coefficient of dynamic friction of a cured product of the fluorine-containing compound is preferably 0.02 to 0.18, more preferably 0.03 to 0.15. When the coefficient of dynamic friction is in the above-defined range, the occurrence of scratching upon friction of the surface can be effectively prevented. The contact angle of the cured product with water is preferably 90 to 130 degrees, more preferably 100 to 120 degrees. When the contact angle of the cured product with water is in the above-defined range, contamination, for example, with fingerprints or oil can be effectively prevented. Fillers such as silica particles may be properly added to the lower-refractive index layer according to the present invention from the viewpoint of improving the strength of the film.

Specific examples of curable fluorine-containing compounds include perfluoroalkyl group-containing silane compounds (for example, heptadecafluoro-1,1,2,2-tetrahydrodecyl)triethoxysilane) and, further, fluorine-containing copolymers comprising, as constituents, fluorine-containing monomer units and constitutional units for imparting a crosslinking reactivity. Specific examples of fluorine-containing monomer units include fluoroolefins (for example, fluoroethylene, vinylidene fluoride, tetrafluoroethylene, hexafluoroethylene, hexafluoropropylene, and perfluoro-2,2-dimethyl-1,3-dioxol), partially or fully fluorinated alkyl ester derivatives of (meth)acrylic acid (for example, Viscoat 6FM (manufactured by Osaka Organic Chemical Industry Ltd.) and M-2020 (manufactured by Daikin Industries, Ltd.)), and fully or partially fluorinated vinyl ethers. Preferred are perfluoroolefins. Hexafluoropropylene is particularly preferred, for example, from the viewpoints of refractive index, solubility, transparency, and availability.

Constitutional units for imparting curing reactivity include constitutional units produced by polymerizing monomers previously containing a self-curable functional group in its molecule such as glycidyl (meth)acrylate and glycidyl vinyl ether, constitutional units produced by polymerizing carboxyl group-, hydroxy group-, amino group-, or sulfo group-containing monomers (for example, (meth)acrylic acid, methylol (meth)acrylate, hydroxyalkyl (meth)acrylate, allyl acrylate, hydroxyethyl vinyl ether, hydroxybutyl vinyl ether, maleic acid, or crotonic acid), and constitutional units containing a curing reactive group, such as a (meth)acryloyl group, introduced, for example, by a polymer reaction (for example, the curing reactive group may be introduced by allowing acrylic acid chloride to act on a hydroxyl group) into these constitutional units.

In addition to the above fluorine-containing monomer unit and the constitutional unit for imparting curing reactivity, a fluorine atom-free monomer may be properly copolymerized, for example, from the viewpoint of solubility in solvents and transparency of the film. The monomer unit usable in combination is not particularly limited, and examples thereof include olefins (for example, ethylene, propylene, isoprene, vinyl chloride, or vinylidene chloride), acrylic esters (for example, methyl acrylate, methyl acrylate, ethyl acrylate, or 2-ethylhexyl acrylate), methacrylic esters (for example, methyl methacrylate, ethyl methacrylate, butyl methacrylate, or ethylene glycol dimethacrylate), styrene derivatives (for example, styrene, divinyl benzene, vinyltoluene, or α-methylstyrene), vinyl ethers (for example, methylvinyl ether, ethylvinyl ether, or cyclohexyl vinyl ether), vinylesters (for example, vinyl acetate, vinyl propionate, or vinyl cinnamate), acrylamides (for example, N-tert butylacrylamide or N-cyclohexylacrylamide), methacrylamides, and acrylonitrile derivatives.

As described in Japanese Patent Laid-Open No. 92323/1996, Japanese Patent Laid-Open No. 25388/1998, Japanese Patent Laid-Open No. 147739/1998, and Japanese Patent Laid-Open No. 17028/2000 (the contents of which are incorporated herein by reference), the polymer may be used in combination with a curing agent. In particular, when the curing reactive group of the polymer is a group which as such does not have any curing reactivity, such as a hydroxyl or carboxyl group, the use of the curing agent is indispensable. Curing agents include, for example, polyisocyanate, aminoplasts, polybasic acids, or anhydrides thereof. On the other hand, when the curing reactive group is a self-curing reactive group, there is no need to add any curing agent. If necessary, however, various curing agents such as polyfunctional (meth)acrylate compounds and polyfunctional epoxy compounds may also be further used.

In the present invention, a fluorine-containing copolymers particularly useful as the lower-refractive index agent is a random copolymer of perfluoroolefins with vinyl ethers or vinyl esters. In particular, the fluorine-containing copolymer preferably contains a group which as such can undergo a crosslinking reaction [for example, a radically reactive group such as an (meth)acryloyl group, an epoxy group, an oxetanyl group or other ring opening polymerizable group]. Preferably not less than 5% by mole and not more than 70% by mole, particularly preferably not less than 30% by mole and not more than 60% by mole, of all the polymerization units of the polymer is accounted for by the crosslinking reactive group-containing polymerization unit.

Further, in the present invention, in the lower-refractive index agent according to the present invention, a polysiloxane structure is preferably introduced into the fluorine-containing polymer from the viewpoint of imparting the contamination preventive property. The polysiloxane structure can be introduced by any method without particular limitation. Preferred methods thereof include, for example, methods as described in Japanese Patent Laid-Open No. 189621/1999, Japanese Patent Laid-Open No. 228631/1999, Japanese Patent Laid-Open No. 313709/2000 (the contents of which are incorporated herein by reference), in which a polysiloxane block comonomer component is introduced using a silicone macroazo initiator, and a method as described in Japanese Patent Laid-Open No. 251555/1990 and Japanese Patent Laid-Open No. 308806/1990 (the contents of which are incorporated herein by reference), in which a polysiloxane graft comonomer component is introduced using a silicone macromer. In these cases, the content of the polysiloxane component in the polymer is preferably not less than 0.5% by mass and not more than 10% by mass, particularly preferably not less than 1% by mass and not more than 5% by mass.

In order to impart contamination preventive properties, in addition to the above methods, a method is also preferred in which reactive group-containing polysiloxane (for example, tradenames; KF-100T, X-22-169AS, KF-102, X-22-37011E, X-22-164B, X-22-5002, X-22-173B, X-22-174D, X-22-167B, and X-22-161AS, the above products being manufactured by The Shin-Etsu Chemical Co., Ltd., tradenames; AK-5, AK-30, and AK-32, the above products being manufactured by TOAGOSEI Co., Ltd., and tradenames; SILAPLANE FM0275 and SILAPLANE FM0721, the above products being manufactured by Chisso Corp.) are added. In this case, the addition amount of the polysiloxane is not less than 0.5% by mass and not more than 10% by mass, particularly preferably not less than 1% by mass and not more than 5% by mass, based on the total solid content of the lower-refractive index layer.

In the lower-refractive index layer according to the present invention, for example, TEFRON®: AF1600 (manufactured by Du Pont (E.I.) de Nemours & Co.: refractive index n=1.30), CYTOP (manufactured by Asahi Glass Co., Ltd.: n=1.34), 17FM (manufactured by Mitsubishi Rayon Co., Ltd.: n=1.35), Opstar JN-7212 (manufactured by JSR Corporation: n=1.40), Opstar JN-7228 (manufactured by JSR Corporation: n=1.42), and LR201 (manufactured by Nissan Chemical Industries Ltd.: n=1.38) (all the above products being tradenames) are also usable as commercially available fluorine-containing compounds. Specific examples of preferred lower-refractive index agents according to the present invention include silicone-containing vinylidene fluoride copolymers, and an example thereof is a composition comprising 100 parts by weight of a fluorine-containing copolymer and 80 to 150 parts by weight of an ethylenically unsaturated group-containing polymerizable compound. The fluorine-containing copolymer has a fluorine content of 60 to 70% by weight and is produced by copolymerizing a monomer composition comprising 30 to 90% by weight of vinylidene fluoride and 5 to 50% by weight of hexafluoropropylene.

Examples of silicone components include (poly)dimethylsiloxane, (poly)diethylsiloxane, (poly)diphenylsiloxane, (poly)methylphenylsiloxane, alkyl-modified (poly)dimethylsiloxane, azo group-containing (poly)dimethylsiloxane, dimethyl silicones, phenylmethyl silicones, alkyl- or aralkyl-modified silicones, fluorosilicones, polyether-modified silicones, fatty ester-modified silicones, methyl hydrogen silicones, silanol group-containing silicones, alkoxy group-containing silicones, phenol group-containing silicones, methacryl-modified silicones, amino-modified silicones, carboxylic acid-modified silicones, carbinol-modified silicones, epoxy-modified silicones, mercapto-modified silicones, fluorine-modified silicones, and polyether-modified silicones. Among them, compounds having a dimethylsiloxane structure are preferred.

A copolymer produced by copolymerizing a monomer composition containing vinylidene fluoride and hexafluoropropylene may be mentioned as the fluorine-containing copolymer. Regarding the proportion of each component in the monomer composition, the content of vinylidene fluoride is 30 to 90% by weight, preferably 40 to 80% by weight, particularly preferably 40 to 70% by weight, and the content of hexafluoropropylene is 5 to 50% by weight, preferably 10 to 50% by weight, particularly preferably 15 to 45% by weight. The monomer composition may further comprise 0 to 40% by weight, preferably 0 to 35% by weight, particularly preferably 10 to 30% by weight, of tetrafluoroethylene.

The monomer composition for producing the fluorine-containing copolymer may if necessary contain other comonomer component(s), for example, in an amount of not more than 20% by weight, preferably not more than 10% by weight. Specific examples of such comonomer components include fluorine atom-containing polymerizable monomers such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, and α-trifluoromethacrylic acid.

The content of fluorine in the fluorine-containing copolymer produced from the monomer composition is preferably 60 to 70% by weight, more preferably 62 to 70% by weight, particularly preferably 64 to 68% by weight. When the fluorine content is in the above-defined range, the fluorine-containing copolymer has good solubility in solvents which will be described later. The incorporation of the fluorine-containing copolymer as a component can realize the formation of a optical laminate having excellent adhesion, a high level of transparency, a low refractive index, and excellent mechanical strength.

The molecular weight of the fluorine-containing copolymer is preferably 5,000 to 200,000, particularly preferably 10,000 to 100,000, in terms of number average molecular weight as determined using polystyrene as a standard. When the fluorine-containing copolymer having this molecular weight is used, the fluororesin composition has suitable viscosity and thus reliably has suitable coatability.

The refractive index of the fluorine-containing copolymer per se is preferably not more than 1.45, more preferably not more than 1.42, still more preferably not more than 1.40. When the refractive index is in the above defined range, the formed optical laminate has good antireflection effect.

The addition amount of the resin is 30 to 150 parts by weight, preferably 35 to 100 parts by weight, particularly preferably 40 to 70 parts by weight, based on 100 parts by weight of the fluorine-containing copolymer. The content of fluorine based on the total amount of the polymer forming component comprising the fluorine-containing copolymer and the resin is 30 to 55% by weight, preferably 35 to 50% by weight.

When the addition amount or the fluorine content is in the above-defined range, the surface modifying layer has good adhesion to the base material and has a low refractive index, whereby good antireflection effect can be attained.

In a preferred embodiment of the present invention, the utilization of "void-containing fine particles" as a lower-refractive index agent is preferred. "Void-containing fine particles" can lower the refractive index while maintaining the layer strength of the surface modifying layer. In the present invention, the term "void-containing fine particle" refers to a fine particle which has a structure comprising air filled into the inside of the fine particle and/or an air-containing porous structure and has such a property that the refractive index is lowered in reverse proportion to the proportion of air which occupies the fine particle as compared with the refractive index of the original fine particle. Further, such a fine particle which can form a nanoporous structure in at least a part of the inside and/or surface of the coating film by utilizing the form, structure, aggregated state, and dispersed state of the fine particle within the coating film, is also embraced in the present invention.

Specific examples of preferred void-containing inorganic fine particles are silica fine particles prepared by a technique disclosed in Japanese Patent Laid-Open No. 233611/2001. The void-containing silica fine particles can easily be produced. Further, the hardness of the void-containing silica fine particles is high. Therefore, when a surface modifying layer is formed by using a mixture of the void-containing silica fine particles with a binder, the layer has improved strength and, at the same time, the refractive index can be regulated to a range of approximately 1.20 to 1.45. Hollow polymer fine particles produced by using a technique disclosed in Japanese Patent Laid-Open No. 80503/2002 are a specific example of preferred void-containing organic fine particles.

Fine particles which can form a nanoporous structure in at least a part of the inside and/or surface of the coating film include, in addition to the above silica fine particles, sustained release materials, which have been produced for increasing the specific surface area and adsorb various chemical substances on a packing column and the porous part of the surface, porous fine particles used for catalyst fixation purposes, or dispersions or aggregates of hollow fine particles to be incorporated in heat insulating materials or low-dielectric materials. Specific examples of such fine particles include commercially available products, for example, aggregates of porous silica fine particles selected from tradename Nipsil and tradename Nipgel manufactured by Nippon Silica Industrial Co., Ltd. and colloidal silica UP series (tradename), manufactured by Nissan Chemical Industries Ltd., having such a structure that silica fine particles have been connected to one another in a chain form, and fine particles in a preferred particle diameter range specified in the present invention may be selected from the above fine particles.

The average particle diameter of the "void-containing fine particles" is not less than 5 nm and not more than 300 nm. Preferably, the lower limit of the average particle diameter is 8 nm, and the upper limit of the average particle diameter is 100 nm. More preferably, the lower limit of the average particle diameter is 10 nm, and the upper limit of the average particle diameter is 80 nm. When the average diameter of the fine particles is in the above-defined range, excellent transparency can be imparted to the surface modifying layer.

2) Higher-Refractive Index Agent/Medium-Refractive Index Agent

The higher-refractive index agent and the medium-refractive index agent may be added to the surface modifying layer to further improve antireflective properties. The refractive index of the higher-refractive index agent and medium-refractive index agent may be set in a range of 1.46 to 2.00. The medium-refractive index agent has a refractive index in the range of 1.46 to 1.80, and the refractive index of the higher-refractive index agent is in the range of 1.65 to 2.00. These refractive index agents include fine particles, and specific examples thereof (the numerical value within the parentheses being a refractive index) include zinc oxide (1.90), titania (2.3 to 2.7), ceria (1.95), tin-doped indium oxide (1.95), antimony-doped tin oxide (1.80), yttria (1.87), and zirconia (2.0).

Leveling Agent

A leveling agent may be added to the surface modifying layer. Preferred leveling agents include fluorine-type or silicone-type leveling agents. The surface modifying layer to which the leveling agent has been added can realize a good coated face, can effectively prevent the inhibition of curing of the coating film surface by oxygen in coating or drying, and can impart a scratch resistance.

Contamination Preventive Agent

A contamination preventive agent may be added to the surface modifying layer. The contamination preventive agent is mainly used to prevent the contamination of the outermost surface of the optical laminate and can impart scratch resistance to the optical laminate. The contamination preventive agent is not particularly limited so far as the optical properties of optical laminate are not sacrificed. Specific examples of effective contamination preventive agents include fluorocompounds and silicon compounds or mixtures of these compounds. More specific examples thereof include fluoroalkyl group-containing silane coupling agents such as 2-perfluorooctylethyltriaminosilane. Among them, amino group-containing compounds are particularly preferred.

Resin

The surface modifying layer may comprise at least a surface modifying agent and a resin. When the surface modifying layer does not contain a surface modifying agent, the resin functions to seal fine concavoconvexes in the anti-dazzling layer, to render the anti-dazzling layer smooth, and to impart curability. The resin is preferably transparent, and specific examples thereof are classified into ionizing radiation curing resins which are curable upon exposure to ultraviolet light or electron beams, mixtures of ionizing radiation curing resins with solvent drying-type resins (resins which can be brought to films by merely removing a solvent by drying for regulating the solid content in the coating, for example, thermoplastic resins), or heat curing resins. Preferred are ionizing radiation curing resins.

Specific examples of ionizing radiation curing resins include those containing an acrylate-type functional group, for example, oligomers or prepolymers and reactive diluents, for example, relatively low-molecular weight polyester resins, polyether resins, acrylic resins, epoxy resins, urethane resins, alkyd resins, spiroacetal resins, polybutadiene resins, and polythiol polyene resins and (meth)acrylates of polyfunctional compounds such as polyhydric alcohols. Specific examples thereof include monofunctional monomers such as ethyl (meth)acrylate, ethylhexyl (meth)acrylate, styrene, methyl styrene, and N-vinylpyrrolidone, and polyfunctional monomers, for example, polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When the ionizing radiation curing resin is an ultraviolet curing resin, a photopolymerization initiator is preferably used. Specific examples of photopolymerization initiators include acetophenones, benzophenones, Michler's benzoyl benzoate, α-amyloxime ester, thioxanthones, propiophenones, benzyls, benzoins, and acylphosphine oxides. Preferably, photosensitizers are mixed in the system. Specific examples of photosensitizers include n-butylamine, triethylamine, and poly-n-butylphosphine.

When ionizing radiation curing resins are used as an ultraviolet curing resin, a photopolymerization initiator or a photopolymerization accelerator may be added. In the case of a radical polymerizable unsaturated group-containing resin system, acetophenones, benzophenones, thioxanthones, benzoins, benzoin methyl ether and the like are used as a photopolymerization initiator either solely or as a mixture of two or more. On the other hand, in the case of a cation polymerizable functional group-containing resin system, aromatic diazonium salts, aromatic sulfonium salts, aromatic idonium salts, metallocene compounds, benzoinsulfonic esters and the like may be used as a photopolymerization initiator either solely or as a mixture of two or more. The amount of the photopolymerization initiator added is 0.1 to 10 parts by weight based on 100 parts by weight of the ionizing radiation curing composition.

The solvent drying-type resin used as a mixture with the ionizing radiation curing resin is mainly a thermoplastic resin. Commonly exemplified thermoplastic resins are usable. Coating defects of the coated face can be effectively prevented by adding the solvent drying-type resin. Specific examples of preferred thermoplastic resins include styrenic resins, (meth)acrylic resins, vinyl acetate resins, vinyl ether resins, halogen-containing resins, alicyclic olefinic resins, polycarbonate resins, polyester resins, polyamide resins, cellulose derivatives, silicone resins, and rubbers or elastomers. The resin is generally noncrystalline and, at the same time, is soluble in an organic solvent (particularly a common solvent which can dissolve a plurality of polymers and curable compounds). Particularly preferred are resins having good moldability or film forming properties, transparency, and weathering resistance, for example, styrenic resins, (meth)acrylic resins, alicyclic olefinic resins, polyester resins, cellulose derivatives (for example, cellulose esters).

In a preferred embodiment of the present invention, when the light transparent base material is formed of a cellulosic resin such as triacetylcellulose "TAC," specific examples of preferred thermoplastic resins include cellulosic resins, for example, nitrocellulose, acetylcellulose, cellulose acetate propionate, and ethylhydroxyethylcellulose.

Specific examples of heat curing resin include phenolic resins, urea resins, diallyl phthalate resins, melanin resins, guanamine resins, unsaturated polyester resins, polyurethane resins, epoxy resins, aminoalkyd resins, melamine-urea cocondensed resins, silicone resins, and polysiloxane resins. When the heat curing resin is used, if necessary, for example, curing agents such as crosslinking agents and polymerization initiators, polymerization accelerators, solvents, and viscosity modifiers may be further added.

Polymerization Initiator

In the formation of a surface modifying layer, for example, photopolymerization initiators used for ultraviolet curing resins may be used. Specific examples thereof include 1-hydroxy-cyclohexyl-phenyl-ketone. This compound is commercially available, and examples of commercially available products include Irgacure 184 (tradename, manufactured by Ciba Specialty Chemicals, K.K.).

Solvent

A composition for a surface modifying layer comprising the above components mixed with the solvent is utilized for surface modifying layer formation. Specific examples of solvents usable herein include alcohols such as isopropyl alcohol, methanol, and ethanol; ketones such as methyl ethyl ketone, methyl isobutyl ketone, and cyclohexanone; esters such as methyl acetate, ethyl acetate, and butyl acetate; halogenated hydrocarbons; aromatic hydrocarbons such as toluene and xylene; or mixture thereof. Preferred are ketones and esters. A preferred solvent may be selected and used according to the type and solubility of the polymer and curable resin precursor. A solvent capable of homogeneously dissolving at least the solid matter (a plurality of polymers and curable resin precursor, a reaction initiator, and other additives) is preferred. Examples of such solvents include ketones (for example, acetone, methyl ethyl ketone, methyl isobutyl ketone, and cyclohexanone), ethers (for example, dioxane and tetrahydrofuran), aliphatic hydrocarbons (for example, hexane), alicyclic hydrocarbons (for example, cyclohexane), aromatic hydrocarbons (for example, toluene and xylene), halogenated hydrocarbons (for example, dichloromethane and dichloroethane), esters (for example, methyl acetate, ethyl acetate and butyl acetate), water, alcohols (for example, ethanol, isopropanol, butanol, and cyclohexanol), cellosolves (for example, methylcellosolve and ethylcellosolve), cellosolve acetates, sulfoxides (for example, dimethylsulfoxide), and amides (for example, dimethylformamide and dimethylacetamide). A mixture solvent composed of two or more of these solvents may be used.

Method for Surface Modifying Layer Formation

The surface modifying layer may be formed by applying a composition for a surface modifying layer onto the antidazzling layer. The composition for a surface modifying layer may be formed by coating methods such as roll coating, Mayer bar coating, or gravure coating. After coating of the composition for a surface modifying layer, the coating is dried and cured by ultraviolet light irradiation. Specific examples of ultraviolet light sources include ultra-high-pressure mercury lamps, high-pressure mercury lamps, low-pressure mercury lamps, carbon arc lamps, black light fluorescent lamps, and metal halide lamps. Regarding the wavelength of the ultraviolet light, a wavelength range of 190 to 380 nm may be used. Specific examples of electron beam sources include various electron beam accelerators, for example, Cockcroft-Walton accelerators, van de Graaff accelerators, resonance transformer accelerators, insulated core transformer accelerators, linear accelerators, Dynamitron accelerators, and high-frequency accelerators.

2) Optional Layers

The optical laminate according to the present invention comprises a light transparent base material, an anti-dazzling layer, and, if necessary, a surface modifying layer. Optional layers such as an antistatic layer, a lower-refractive index layer, and a contamination preventive layer may be further provided. The lower-refractive index layer preferably has a lower refractive index than the refractive index of the antidazzling layer or surface modifying layer. The antistatic layer, lower-refractive index layer, contamination preventive layer and the like may be formed by using a composition prepared by mixing a resin and the like with an antistatic agent, a lower-refractive index agent, a contamination preventive agent or the like as described above in connection with the surface modifying layer. Accordingly, the antistatic agent, lower-refractive index agent, contamination preventive agent, resin and the like may be the same as those used in the formation of the surface modifying layer.

3. Light Transparent Base Material

The light transparent base material is preferably smooth and possesses excellent heat resistance and mechanical strength. Specific examples of materials usable for the light transparent base material formation include thermoplastic resins, for example, polyesters (polyethylene terephthalate and polyethylene naphthalate), cellulose triacetate, cellulose diacetate, cellulose acetate butyrate, polyesters, polyamide, polyimide, polyethersulfone, polysulfone, polypropylene, polymethylpentene, polyvinyl chloride, polyvinylacetal, polyether ketone, polymethyl methacrylate, polycarbonate, and polyurethane. Preferred are polyesters (polyethylene terephthalate and polyethylene naphthalate) and cellulose triacetate. Films of amorphous olefin polymers (cycloolefin polymers: COPs) having an alicyclic structure may also be mentioned as other examples of the light transparent base material. These films are base materials using norbornene polymers, monocyclic olefinic polymers, cyclic conjugated diene polymers, vinyl alicyclic hydrocarbon polymer resins and the like, and examples thereof include Zeonex and ZEONOR, manufactured by Zeon Corporation (norbornene resins), Sumilight FS-1700 manufactured by Sumitomo Bakelite Co., Ltd., ARTON (modified norbornene resin) manufactured by JSR Corporation, APL (cyclic olefin copolymer) manufactured by Mitsui Chemicals Inc., Topas (cyclic olefin copolymer) manufactured by Ticona, and Optiet OZ-1000 series (alicyclic acrylic resins) manufactured by Hitachi Chemical Co., Ltd. Further, FV series (low birefringent index and low photoelastic films) manufactured by Asahi Kasei Chemicals Corporation are also preferred as base materials alternative to triacetylcellulose.

In the present invention, preferably, these thermoplastic resins are used as a highly flexible thin film. Depending upon the form of use where curability are required, plate-like materials such as plates of these thermoplastic resins or glass plates are also usable.

The thickness of the light transparent base material is not less than 20 μm and not more than 300 μm. Preferably, the upper limit of the thickness is 200 μm, and the lower limit of the thickness is 30 μm. When the light transparent base material is a plate-like material, the thickness may be above the upper limit of the above-defined thickness range. In forming an anti-dazzling layer on the light transparent base material, the base material may be previously subjected to physical treatment such as corona discharge treatment or oxidation treatment or may be previously coated with an anchoring agent or a coating material known as a primer from the viewpoint of improving the adhesion.

Utilization of Optical Laminate

The optical laminate produced by the process according to the present invention may be used in the following applications.

Polarizing Plate

In another embodiment of the present invention, there is provided a polarizing plate comprising a polarizing element and the optical laminate according to the present invention. More specifically, there is provided a polarizing plate comprising a polarizing element and the optical laminate according to the present invention provided on the surface of the polarizing element, the optical laminate being provided so that the surface of the optical laminate remote from the anti-dazzling layer faces the surface of the polarizing element.

The polarizing element may comprise, for example, polyvinyl alcohol films, polyvinylformal films, polyvinylacetal films, and ethylene-vinyl acetate copolymer-type saponified films, which have been dyed with iodine or a dye and stretched. In the lamination treatment, preferably, the light transparent base material (preferably a triacetylcellulose film) is saponified from the viewpoint of increasing the adhesion or antistatic purposes.

Image Display Device

In a further embodiment of the present invention, there is provided an image display device. The image display device comprises a transmission display and a light source device for applying light to the transmission display from its back side. The optical laminate according to the present invention or the polarizing plate according to the present invention is provided on the surface of the transmission display. The image display device according to the present invention may basically comprise a light source device (backlight), a display element, and the optical laminate according to the present invention. The image display device is utilized in transmission display devices, particularly in displays of televisions, computers, word processors and the like. Among others, the image display device is used on the surface of displays for high-definition images such as CRTs, liquid crystal panels, PDPs, and ELDs.

When the image display device according to the present invention is a liquid crystal display device, light emitted from the light source device is applied through the lower side of the optical laminate according to the present invention. In STN-type liquid crystal display devices, a phase difference plate may be inserted into between the liquid crystal display element and the polarizing plate. If necessary, an adhesive layer may be provided between individual layers in the liquid crystal display device.

EXAMPLES

The following embodiments further illustrate the present invention. However, it should be noted that the contents of the present invention are not limited by these embodiments. The "parts" and "%" are by mass unless otherwise specified. All of monodisperse fine particles incorporated in the following compositions are those having a particle size distribution of average particle diameter ±0.3 to ±1 μm. In the case of fine particles having particle diameters of not more than 3.5 μm, however, this particle distribution is not applied.

Preparation of Composition for Anti-Dazzling Layer Composition 1 for Anti-Dazzling Layer Pentaerythritol triacrylate (PETA) (manufactured by Nippon Kayaku Co., Ltd., refractive index 1.51) (20.28 parts by mass) as an ultraviolet curing resin, 8.62 parts by mass of DPHA (manufactured by Nippon Kayaku Co., Ltd., refractive index 1.51) as an ultraviolet curing resin, 3.03 parts by mass of an acrylic polymer (manufactured by Mitsubishi Rayon Co., Ltd., molecular weight 75,000) as an ultraviolet curing resin, 1.86 parts by mass of Irgacure 184 (manufactured by Ciba-Geigy Limited) as a photocuring initiator, 0.31 part by mass of Irgacure 907 (manufactured by Ciba-Geigy Limited) as a photocuring initiator, 6.39 parts by mass of monodisperse acrylic beads (manufactured by Nippon Shokubai Kagaku Kogyo Co., Ltd., particle diameter 5.0 μm, refractive index 1.53) as light transparent fine particles, 0.013 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition 1 for an anti-dazzling layer.

Composition 2 for Anti-Dazzling Layer

Composition 2 for an anti-dazzling layer was prepared in the same manner as in composition 1 for an anti-dazzling layer, except that the light transparent fine particles were changed to monodisperse acrylic beads having a particle diameter of 9.5 μm (manufactured by Nippon Shokubai Kagaku Kogyo Co., Ltd., refractive index 1.53).

Composition 3 for Anti-Dazzling Layer

Composition 3 for an anti-dazzling layer was prepared in the same manner as in composition 1 for an anti-dazzling layer, except that the light transparent fine particles were changed to monodisperse acrylic beads having a particle diameter of 13.5 μm (manufactured by Nippon Shokubai Kagaku Kogyo Co., Ltd., refractive index 1.53).

Composition 4 for Anti-Dazzling Layer

Pentaerythritol triacrylate (PETA) (manufactured by Nippon Kayaku Co., Ltd., refractive index 1.51) (21.08 parts by mass) as an ultraviolet curing resin, 10.33 parts by mass of DPHA (manufactured by Nippon Kayaku Co., Ltd., refractive index 1.51) as an ultraviolet curing resin, 3.24 parts by mass of an acrylic polymer (manufactured by Mitsubishi Rayon Co., Ltd., molecular weight 75,000) as an ultraviolet curing resin, 2.02 parts by mass of Irgacure 184 (manufactured by Ciba-Geigy Limited) as a photocuring initiator, 0.34 part by mass of Irgacure 907 (manufactured by Ciba-Geigy Limited) as a photocuring initiator, 3.47 parts by mass of monodisperse acrylic beads (manufactured by Nippon Shokubai Kagaku Kogyo Co., Ltd., particle diameter 13.5 μm, refractive index 1.53) as light transparent fine particles, 0.014 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition 4 for an anti-dazzling layer.

Composition 5 for Anti-Dazzling Layer

Pentaerythritol triacrylate (PETA) (manufactured by Nippon Kayaku Co., Ltd., refractive index 1.51) (21.88 parts by mass) as an ultraviolet curing resin, 12.03 parts by mass of DPHA (manufactured by Nippon Kayaku Co., Ltd., refractive index 1.51) as an ultraviolet curing resin, 3.46 parts by mass of an acrylic polymer (manufactured by Mitsubishi Rayon Co., Ltd., molecular weight 75,000) as an ultraviolet curing resin, 2.19 parts by mass of Irgacure 184 (manufactured by Ciba-Geigy Limited) as a photocuring initiator, 0.37 part by mass of Irgacure 907 (manufactured by Ciba-Geigy Limited) as a photocuring initiator, 6.39 parts by mass of monodisperse acrylic beads (manufactured by Nippon Shokubai Kagaku Kogyo Co., Ltd., particle diameter 9.5 µm, refractive index 1.53) as light transparent fine particles, 0.015 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 µm to prepare composition 5 for an anti-dazzling layer.

Composition 6 for Anti-Dazzling Layer

Composition 6 for an anti-dazzling layer was prepared in the same manner as in the composition 1 for an anti-dazzling layer, except that the light transparent fine particles were changed to acrylic beads having a particle size distribution of 5.0 µm in terms of particle diameter (manufactured by Nippon Shokubai Kagaku Kogyo Co., Ltd., refractive index 1.53).

Composition 7 for Anti-Dazzling Layer

Pentaerythritol triacrylate (PETA) (manufactured by Nippon Kayaku Co., Ltd., refractive index 1.51) (20.28 parts by mass) as an ultraviolet curing resin, 8.62 parts by mass of DPHA (manufactured by Nippon Kayaku Co., Ltd., refractive index 1.51) as an ultraviolet curing resin, 3.03 parts by mass of an acrylic polymer (manufactured by Mitsubishi Rayon Co., Ltd., molecular weight 75,000) as an ultraviolet curing resin, 1.86 parts by mass of Irgacure 184 (manufactured by Ciba-Geigy Limited) as a photocuring initiator, 0.31 part by mass of Irgacure 907 (manufactured by Ciba-Geigy Limited) as a photocuring initiator, 4.80 parts by mass of monodisperse acrylic beads (manufactured by Nippon Shokubai Kagaku Kogyo Co., Ltd., particle diameter 9.5 µm, refractive index 1.53) as first light transparent fine particles, 1.59 parts by mass of monodisperse acrylic beads (manufactured by Nippon Shokubai Kagaku Kogyo Co., Ltd., particle diameter 9.5 µm, refractive index 1.53) as second light transparent fine particles, 0.013 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 µm to prepare composition 7 for an anti-dazzling layer.

Composition 8 for Anti-Dazzling Layer

Pentaerythritol triacrylate (PETA) (manufactured by Nippon Kayaku Co., Ltd., refractive index 1.51) (21.61 parts by mass) as an ultraviolet curing resin, 9.28 parts by mass of DPHA (manufactured by Nippon Kayaku Co., Ltd., refractive index 1.51) as an ultraviolet curing resin, 2.61 parts by mass of an acrylic polymer (manufactured by Mitsubishi Rayon Co., Ltd., molecular weight 75,000) as an ultraviolet curing resin, 0.65 part by mass of a styrene-acrylic polymer (manufactured by The Inctec Inc., molecular weight 65,000) as an ultraviolet curing resin, 2.02 parts by mass of Irgacure 184 (manufactured by Ciba-Geigy Limited) as a photocuring initiator, 0.34 part by mass of Irgacure 907 (manufactured by Ciba-Geigy Limited) as a photocuring initiator, 5.47 parts by mass of acrylic beads (manufactured by Nippon Shokubai Kagaku Kogyo Co., Ltd., particle diameter 1.9 µm, refractive index 1.53) as first light transparent fine particles, 0.014 part by mass of a silicone leveling agent 10-28 (manufactured by The Inctec Inc.), 46.40 parts by mass of toluene, and 11.60 parts by mass of cyclohexanone were thoroughly mixed together to prepare a composition. In this case, second light transparent fine particles were not used. This composition was filtered through a polypropylene filter having a pore diameter of 30 µm to prepare composition 8 for an anti-dazzling layer.

Composition 9 for Anti-Dazzling Layer

Pentaerythritol triacrylate (PETA) (manufactured by Nippon Kayaku Co., Ltd., refractive index 1.51) (20.82 parts by mass) as an ultraviolet curing resin, 7.72 parts by mass of DPHA (manufactured by Nippon Kayaku Co., Ltd., refractive index 1.51) as an ultraviolet curing resin, 3.06 parts by mass of an acrylic polymer (manufactured by Mitsubishi Rayon Co., Ltd., molecular weight 75,000) as an ultraviolet curing resin, 1.86 parts by mass of Irgacure 184 (manufactured by Ciba-Geigy Limited) as a photocuring initiator, 0.31 part by mass of Irgacure 907 (manufactured by Ciba-Geigy Limited) as a photocuring initiator, 8.21 parts by mass of acrylic beads (manufactured by Nippon Shokubai Kagaku Kogyo Co., Ltd., particle diameter 4.6 µm, refractive index 1.52) as first light transparent fine particles, 0.013 part by mass of a silicone leveling agent 10-28 (manufactured by The Inctec Inc.), 46.40 parts by mass of toluene, and 11.60 parts by mass of cyclohexanone were thoroughly mixed together to prepare a composition. In this case, second light transparent fine particles were not used. This composition was filtered through a polypropylene filter having a pore diameter of 30 µm to prepare composition 9 for an anti-dazzling layer.

Composition 10 for Anti-Dazzling Layer

Pentaerythritol triacrylate (PETA) (manufactured by Nippon Kayaku Co., Ltd., refractive index 1.51) (21.28 parts by mass) as an ultraviolet curing resin, 8.63 parts by mass of DPHA (manufactured by Nippon Kayaku Co., Ltd., refractive index 1.51) as an ultraviolet curing resin, 3.18 parts by mass of an acrylic polymer (manufactured by Mitsubishi Rayon Co., Ltd., molecular weight 75,000) as an ultraviolet curing resin, 1.96 parts by mass of Irgacure 184 (manufactured by Ciba-Geigy Limited) as a photocuring initiator, 0.33 part by mass of Irgacure 907 (manufactured by Ciba-Geigy Limited) as a photocuring initiator, 4.96 parts by mass of acrylic beads (manufactured by Nippon Shokubai Kagaku Kogyo Co., Ltd., particle diameter 4.6 µm, refractive index 1.53) as first light transparent fine particles, 1.65 parts by mass of acrylic beads (manufactured by Nippon Shokubai Kagaku Kogyo Co., Ltd., particle diameter 3.5 µm, refractive index 1.53) as second light transparent fine particles, 0.013 part by mass of a silicone leveling agent 10-28 (manufactured by The Inctec Inc.), 46.40 parts by mass of toluene, and 11.60 parts by mass of cyclohexanone were thoroughly mixed together to prepare a composition. This composition was filtered through a polypropylene filter having a pore diameter of 30 µm to prepare composition 10 for an anti-dazzling layer.

Composition 11 for Anti-Dazzling Layer

Pentaerythritol triacrylate (PETA) (manufactured by Nippon Kayaku Co., Ltd., refractive index 1.51) (21.28 parts by mass) as an ultraviolet curing resin, 8.63 parts by mass of DPHA (manufactured by Nippon Kayaku Co., Ltd., refractive index 1.51) as an ultraviolet curing resin, 3.02 parts by mass of an acrylic polymer (manufactured by Mitsubishi Rayon Co., Ltd., molecular weight 75,000) as an ultraviolet curing resin, 0.16 part by mass of a styrene-acrylic polymer (manufactured by The Inctec Inc., molecular weight 65,000) as an ultraviolet curing resin, 1.96 parts by mass of Irgacure 184 (manufactured by Ciba-Geigy Limited) as a photocuring initiator, 0.33 part by mass of Irgacure 907 (manufactured by Ciba-Geigy Limited) as a photocuring initiator, 5.62 parts by mass of acrylic beads (manufactured by Nippon Shokubai Kagaku Kogyo Co., Ltd., particle diameter 3.5 µm, refractive index 1.53) as first light transparent fine particles, 0.99 part by mass of acrylic beads (manufactured by Nippon Shokubai Kagaku Kogyo Co., Ltd., particle diameter 3.5 μm, refractive index 1.52) as second light transparent fine particles, 0.013 part by mass of a silicone leveling agent 10-28 (manufactured by The Inctec Inc.), 46.40 parts by mass of toluene, and 11.60 parts by mass of cyclohexanone were thoroughly mixed together to prepare a composition. This composition was filtered through a polypropylene filter having a pore diameter of 30 μm to prepare composition 11 for an anti-dazzling layer.

Composition 12 for Anti-Dazzling Layer

Pentaerythritol triacrylate (PETA) (manufactured by Nippon Kayaku Co., Ltd., refractive index 1.51) (20.96 parts by mass) as an ultraviolet curing resin, 8.02 parts by mass of DPHA (manufactured by Nippon Kayaku Co., Ltd., refractive index 1.51) as an ultraviolet curing resin, 3.10 parts by mass of an acrylic polymer (manufactured by Mitsubishi Rayon Co., Ltd., molecular weight 75,000) as an ultraviolet curing resin, 1.89 parts by mass of Irgacure 184 (manufactured by Ciba-Geigy Limited) as a photocuring initiator, 0.32 part by mass of Irgacure 907 (manufactured by Ciba-Geigy Limited) as a photocuring initiator, 4.81 parts by mass of styrene beads (manufactured by Soken Chemical Engineering Co., Ltd., particle diameter 5.0 μm, refractive index 1.53) as first light transparent fine particles, 2.89 parts by mass of melamine beads (manufactured by Nippon Shokubai Kagaku Kogyo Co., Ltd., particle diameter 1.8 μm, refractive index 1.68) as second light transparent fine particles, 0.013 part by mass of a silicone leveling agent 10-28 (manufactured by The Inctec Inc.), 46.40 parts by mass of toluene, and 11.60 parts by mass of cyclohexanone were thoroughly mixed together to prepare a composition. This composition was filtered through a polypropylene filter having a pore diameter of 30 μm to prepare composition 12 for an anti-dazzling layer.

Composition 13 for Anti-Dazzling Layer

A zirconia-containing coating composition (manufactured by JSR, tradename; "KZ 7973", a resin matrix having a refractive index of 1.69) was provided. Composition 13 for an anti-dazzling layer was prepared according to the following formulation so that the resin matrix had a refractive index of 1.63.

Pentaerythritol triacrylate (PETA) (manufactured by Nippon Kayaku Co., Ltd., refractive index 1.51) (17.76 parts by mass) as an ultraviolet curing resin, 19.62 parts by mass of zirconia to be incorporated in the ultraviolet curing resin for developing the resin matrix (manufactured by JSR, zirconia contained in tradename; "KZ 7973," average particle diameter 40 to 60 nm, refractive index 2.0), 1.40 parts by mass of a zirconia dispersing agent (manufactured by JSR, a zirconia dispersion stabilizer also contained in tradename; "KZ 7973,"), 0.94 part by mass of an acrylic polymer (manufactured by Mitsubishi Rayon Co., Ltd., molecular weight 40,000) as an ultraviolet curing resin, 1.21 parts by mass of Irgacure 184 (manufactured by Ciba-Geigy Limited) as a photocuring initiator, 0.20 part by mass of Irgacure 907 (manufactured by Ciba-Geigy Limited) as a photocuring initiator, 1.81 parts by mass of styrene beads (manufactured by Soken Chemical Engineering Co., Ltd., particle diameter 3.5 μm, refractive index 1.60) as first light transparent fine particles, 2.02 parts by mass of acrylic beads (manufactured by Soken Chemical Engineering Co., Ltd., particle diameter 1.5 μm, refractive index 1.49) as second light transparent fine particles, 0.030 part by mass of a silicone leveling agent 10-28 (manufactured by The Inctec Inc.), 41.76 parts by mass of toluene, 10.44 parts by mass of cyclohexanone, and 2.80 parts by mass of MEK were thoroughly mixed together to prepare a composition. This composition was filtered through a polypropylene filter having a pore diameter of 30 μm to prepare composition 13 for an anti-dazzling layer.

Composition 14 for Anti-Dazzling Layer

Composition 14 for an anti-dazzling layer was prepared in the same manner as in composition 10 for an anti-dazzling layer, except that Bright GNR4.6-EH (gold-nickel coated resin beads; manufactured by The Nippon Chemical Industrial Co., Ltd.) as an electroconductive material (electroconductive particles) was added in an amount of 0.1% based on the total mass of the anti-dazzling layer.

Composition 15 for Anti-Dazzling Layer

Composition 15 for an anti-dazzling layer was prepared in the same manner as in composition 4 for an anti-dazzling layer, except that an amorphous silica matting agent dispersed ink: EXG 40-77 (Z-15M) (a dispersion liquid of amorphous silica having an average particle diameter of 2.5 μm in resin (PETE): manufactured by Dainichiseika Color & Chemicals Manufacturing Co., Ltd.), and, when the total resin amount in the total solid matter amount was presumed to be 100 parts by mass, the amount of the monodisperse acrylic beads (manufactured by Nippon Shokubai Kagaku Kogyo Co., Ltd., particle diameter 13.5 μm, refractive index 1.53) as light transparent fine particles and the amount of the amorphous silica were 10 parts by mass and 7.5 parts by mass, respectively.

Composition 16 for Anti-Dazzling Layer

An amorphous silica-containing coating composition (tradename; "EXG 40-77 (Z-15M)" (average particle diameter of amorphous silica 2.5 μm, manufactured by Dainichiseika Color & Chemicals Manufacturing Co., Ltd.) (3.3 g), an ultraviolet curing resin composition (tradename; "EXG 40-77 (S-2)," manufactured by Dainichiseika Color & Chemicals Manufacturing Co., Ltd.) (1.5 g), 0.03 g of a silicone leveling agent 10-28 (manufactured by The Inctec Inc.), and 4.4 g of toluene were thoroughly mixed together to prepare a composition. This composition was filtered through a polypropylene filter having a pore diameter of 80 μm to prepare composition 16 for an anti-dazzling layer.

Composition 17 for Anti-Dazzling Layer

An amorphous silica-containing coating composition (tradename; "EXG 40-77 (D-30M)" (average particle diameter of amorphous silica 1.5 μm, manufactured by Dainichiseika Color & Chemicals Manufacturing Co., Ltd.) (3.5 g), an ultraviolet curing resin composition (tradename; "EXG 40-77 (S-2)," manufactured by Dainichiseika Color & Chemicals Manufacturing Co., Ltd.) (1.6 g), 0.03 g of a silicone leveling agent 10-28 (manufactured by The Inctec Inc.), and 4.5 g of toluene were thoroughly mixed together to prepare a composition. This composition was filtered through a polypropylene filter having a pore diameter of 80 μm to prepare composition 17 for an anti-dazzling layer.

Preparation of Composition for Surface Modifying Layer

Composition 1 for Surface Modifying Layer

PETA (manufactured by Nippon Kayaku Co., Ltd., refractive index 1.51) (42.43 parts by mass) as an ultraviolet curing resin, 2.55 parts by mass of Irgacure 184 (manufactured by Ciba-Geigy Limited) as a photocuring initiator, 0.19 part by mass of a silicone leveling agent 10-28 (manufactured by The Inctec Inc.), 49.35 parts by mass of toluene, and 5.48 parts by mass of cyclohexanone were thoroughly mixed together to prepare a composition. This composition was filtered through a polypropylene filter having a pore diameter of 10 μm to prepare composition 1 for a surface modifying layer.

Composition 2 for Surface Modifying Layer

DPHA (manufactured by Nippon Kayaku Co., Ltd., refractive index 1.51) (39.30 parts by mass) as an ultraviolet curing resin, 3.13 parts by mass of an acrylic polymer (manufactured by Mitsubishi Rayon Co., Ltd., molecular weight 40,000) as an ultraviolet curing resin, 2.12 parts by mass of Irgacure 184 (manufactured by Ciba-Geigy Limited) as a photocuring initiator, 0.43 part by mass of Irgacure 907 (manufactured by Ciba-Geigy Limited) as a photocuring initiator, 0.19 part by mass of a silicone leveling agent 10-28 (manufactured by The Inctec Inc.), 49.35 parts by mass of toluene, and 5.48 parts by mass of cyclohexanone were thoroughly mixed together to prepare a composition. This composition was filtered through a polypropylene filter having a pore diameter of 10 μm to prepare composition 2 for a surface modifying layer.

Composition 3 for Surface Modifying Layer

C-4456 S-7 (an ATO-containing electroconductive ink, average particle diameter of ATO 300 to 400 nm, solid content 45%, manufactured by NIPPON PELNOX CORP.) (21.6 g) as a material for an antistatic layer, 28.69 g of DPHA (manufactured by Nippon Kayaku Co., Ltd., refractive index 1.51) as an ultraviolet curing resin, 1.56 g of Irgacure 184 (manufactured by Ciba-Geigy Limited) as a photocuring initiator, 33.7 g of MIBK (methyl isobutyl ketone), and 14.4 g of cyclohexanone were thoroughly mixed together to prepare a composition. This composition was filtered through a polypropylene filter having a pore diameter of 30 μm to prepare composition 3 for a surface modifying layer.

Composition 4 for Surface Modifying Layer

Composition 4 for a surface modifying layer having the following formulation was prepared using zirconia-containing coating composition (tradename; "KZ 7973", a resin matrix having a refractive index of 1.69, solid content 50%, manufactured by JSR) so that the resin matrix had a refractive index of 1.60. Pentaerythritol triacrylate (PETA) (manufactured by Nippon Kayaku Co., Ltd., refractive index 1.51) (18.59 parts by mass) as an ultraviolet curing resin, 17.18 parts by mass of zirconia (zirconia contained in "KZ 7973" (tradename), average particle diameter 40 to 60 nm, refractive index 2.0, manufactured by JSR) for incorporation in an ultraviolet curing resin to develop a resin matrix, 1.22 parts by mass of a zirconia dispersant (a zirconia dispersion stabilizer contained in "KZ 7973" (tradename), manufactured by JSR), 0.94 part by mass of an acrylic polymer (manufactured by Mitsubishi Rayon Co., Ltd., molecular weight 40,000) as an ultraviolet curing resin, 1.56 parts by mass of Irgacure 184 (manufactured by Ciba-Geigy Limited) as a photocuring initiator, 0.26 part by mass of Irgacure 907 (manufactured by Ciba-Geigy Limited) as a photocuring initiator, 0.039 part by mass of a silicone leveling agent 10-28 (manufactured by The Inctec Inc.), 14.34 parts by mass of toluene, 15.76 parts by mass of cyclohexanone, and 2.80 parts by mass of MEK were thoroughly mixed together to prepare a composition. This composition was filtered through a polypropylene filter having a pore diameter of 30 μm to prepare composition 4 for a surface modifying layer.

Preparation of Composition for Lower-Refractive Index Layer

A photopolymerization initiator (tradename; "JUA701," manufactured by JSR) (0.85 g) and 65 g of MIBK were added to 34.14 g of fluororesin-type coating composition for low-reflective layer formation (tradename; "TM086", manufactured by JSR), and the mixture was stirred and was filtered through a polypropylene filter having a pore diameter of 10 μm to prepare composition for a lower-refractive index layer.

Preparation of Composition for Antistatic Layer

C-4456 S-7 (an ATO-containing electroconductive ink, average particle diameter of ATO 300 to 400 nm, solid content 45%, manufactured by NIPPON PELNOX CORP.) (2.0 g) was provided as a material for an antistatic layer. Methyl isobutyl ketone (2.84 g) and 1.22 g of cyclohexanone were added to the material, and the mixture was stirred and was filtered through a polypropylene filter having a pore diameter of 30 μm to prepare composition for an antistatic layer.

Preparation of Compositions for Thin Layer

A composition for a thin layer was prepared by mixing and filtering the following components according to the following formulation.

| Composition 1 for thin layer | |
|---|---|
| Polyethylene glycol diacrylate (weight average molecular weight 302; "M240"; manufactured by TOAGOSEI Co., Ltd.) | 10 pts. wt. |
| Polymerization initiator (Irgacure 184) | 0.4 pt. wt. |
| Methyl acetate | 15 pts. wt. |
| Composition 2 for thin layer | |
| Isocyanuric acid-modified EO-modified triacrylate (weight average molecular weight 300; M315, manufactured by TOAGOSEI Co., Ltd.) | 10 pts. wt. |
| Polymerization initiator (Irgacure 184) | 0.4 pt. wt. |
| Methyl ethyl ketone | 15 pts. wt. |
| Composition 3 for thin layer | |
| Polyester acrylate (molecular weight 418; M9050; manufactured by TOAGOSEI Co., Ltd.) | 10 pts. wt. |

Production of Optical Laminate

Example 1

An optical laminate according to the present invention was produced as follows.

Formation of Anti-Dazzling Layer

An 80 μm-thick triacetylcellulose film (TD80U, manufactured by Fuji Photo Film Co., Ltd.) was provided as a transparent base material. Composition 1 for an anti-dazzling layer was coated onto the film with a wire-wound rod for coating (Mayer's bar), and the coating was heat dried in an oven of 70° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 5 μm-thick anti-dazzling hardcoat layer was formed. The light transparent fine particles were monodisperse acrylic beads having a particle diameter of 5.0 μm.

Formation of Surface Modifying Layer

The formed anti-dazzling layer was provided as a transparent base material. Composition 1 for a surface modifying layer was coated onto the film with a wire-wound rod for coating (Mayer's bar), and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 3 μm-thick surface modifying layer was formed.

Example 2

An optical laminate was produced in the same manner as in Example 1, except that composition 2 for an anti-dazzling layer was used. The light transparent fine particles in composition 2 for an anti-dazzling layer were monodisperse acrylic beads having a particle diameter of 9.5 μm, and the surface modifying layer had a thickness of 4.0 μm.

Example 3

An optical laminate was produced in the same manner as in Example 1, except that composition 3 for an anti-dazzling layer was used. The light transparent fine particles in composition 3 for an anti-dazzling layer were monodisperse acrylic beads having a particle diameter of 13.5 µm.

Example 4

An optical laminate was produced in the same manner as in Example 1, except that composition 4 for an anti-dazzling layer was used. The light transparent fine particles in composition 4 for an anti-dazzling layer were monodisperse acrylic beads having a particle diameter of 13.5 µm, and the proportion of the light transparent fine particles to the total weight of the solid content was ½ in the case of Example 3.

Example 5

An optical laminate was produced in the same manner as in Example 1, except that composition 5 for an anti-dazzling layer was used. The light transparent fine particles in composition 5 for an anti-dazzling layer were monodisperse acrylic beads having a particle diameter of 9.5 µm, and the proportion of the light transparent fine particles to the total weight of the solid content was 75/1000 in the case of Example 2.

Example 6

Formation of Thin Layer

A cellulose triacetate film (thickness 80 µm) was provided as a base material Composition 1 for a thin layer was coated on one side of the base material at a coverage of 15 g/m² in terms of wet weight (dry weight 6 g/m²). The coating was dried at 50° C. for 30 sec. The dried coating was exposed to ultraviolet light at 100 mJ/cm² to cure the coating. Thereafter, an optical laminate was produced in the same manner as in Example 1, except that composition 6 for an anti-dazzling layer was used. In this case, acrylic beads having a particle size distribution of 5.0 µm were used as light transparent fine particles in composition 6 for an anti-dazzling layer.

Example 7

An optical laminate was produced in the same manner as in Example 6, except that composition 2 for a thin layer and composition 7 for an anti-dazzling layer were used. The first light transparent fine particles in composition 7 for an anti-dazzling layer were monodisperse acrylic beads having a particle diameter of 9.5 µm, and the second light transparent fine particles were monodisperse acrylic beads having a particle diameter of 5.0 µm.

Example 8

An optical laminate was produced in the same manner as in Example 6, except that composition 3 for a thin layer, composition 4 for an anti-dazzling layer, and composition 2 for a surface modifying layer were used. In order to form an electroconductive surface modifying layer, an ATO-containing composition was used in composition 2 for a surface modifying layer.

Example 9

Formation of Antistatic Layer

An 80 µm-thick triacetylcellulose film (TD80U, manufactured by Fuji Photo Film Co., Ltd.) was provided as a transparent base material. The composition for an antistatic layer was coated onto the transparent base material with a wire-wound rod for coating (Mayer's bar), and the coated transparent base material was heat dried in an oven of 50° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 1 µm-thick antistatic layer was formed.

Formation of Anti-Dazzling Layer

Composition 4 for an anti-dazzling layer was coated onto the antistatic layer with a wire-wound rod for coating (Mayer's bar), and the coating was heat dried in an oven of 70° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 3 µm-thick anti-dazzling layer was formed.

Formation of Surface Modifying Layer

Composition 1 for a surface modifying layer was coated onto the anti-dazzling layer with a wire-wound rod for coating (Mayer's bar), and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 3 µm-thick surface modifying layer was formed to produce an optical laminate.

Example 10

Formation of Anti-Dazzling Layer and Surface Modifying Layer

An anti-dazzling layer was formed in the same manner as in Example 1, except that composition 4 for an anti-dazzling layer was used. Further, the surface modifying layer was formed in the same manner as in Example 1, except that ultraviolet light was applied at an exposure of 30 mJ for half curing to cure the coating film.

Formation of Lower-Refractive Index Layer

Composition for a lower-refractive index layer was coated onto the surface modifying layer with a wire-wound rod for coating (Mayer's bar), and the coating was heat dried in an oven of 50° C. for one min to evaporate the solvent component. Thereafter, under nitrogen purge (oxygen concentration: not more than 200 ppm), ultraviolet light was applied at an exposure of 150 mJ to cure the coating film. Thus, a 98 nm-thick lower-refractive index layer was formed to produce an optical laminate.

Example 11

An optical laminate was produced in the same manner as in Example 10, except that composition 3 for a surface modifying layer was used. A zirconia-containing resin matrix was used in composition 3 for a surface modifying layer, and the refractive index of the surface modifying layer was regulated to 1.60.

Example 12

An 80 µm-thick triacetylcellulose film (TD80U, manufactured by Fuji Photo Film Co., Ltd.) was provided as a transparent base material. Composition 8 for an anti-dazzling layer was coated onto the transparent base material with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 6 μm-thick optical laminate was formed. The first light transparent fine particles were acrylic beads having a small particle diameter, and the surface of the particles were hydrophilic. Accordingly, in order to form an aggregated part having a desired three-dimensional structure, a hydrophobic styrene acrylic polymer (molecular weight: 65,000) was added.

Example 13

An optical laminate was produced in the same manner as in Example 12, except that composition 9 for an anti-dazzling layer was used. In composition 9 for an anti-dazzling layer, the first light transparent fine particles were acrylic beads having a particle diameter of 4.6 μm of which the surface was hydrophobic (that is, the particles were dispersible in toluene and were aggregated in methanol).

Example 14

An optical laminate was produced in the same manner as in Example 12, except that composition 10 for an anti-dazzling layer was used. In composition 10 for an anti-dazzling layer, in order to form an aggregated part having a desired three-dimensional structure, the first light transparent fine particles and second light transparent fine particles were selected so that they were different from each other in particle diameter to constitute a mixed particle system composed of the first and second light transparent fine particles.

Example 15

An optical laminate was produced in the same manner as in Example 12, except that composition 11 for an anti-dazzling layer was used. In composition 11 for an anti-dazzling layer, in the same manner as in Example 14, the first light transparent fine particles and second light transparent fine particles were selected so as to constitute a mixed particle system composed of the first and second light transparent fine particles. In this case, the first light transparent fine particles and second light transparent fine particles were identical to each other in particle diameter (3.5 μm). Further, in order to form an aggregated part having a desired three-dimensional structure, the first light transparent fine particles were hydrophobic acrylic beads which were the same as those used in Example 2, and the second light transparent fine particles were hydrophilic acrylic beads which were likely to be aggregated in toluene and to be dispersed in methanol).

Example 16

An optical laminate was produced in the same manner as in Example 12, except that composition 12 for an anti-dazzling layer was used. In composition 12 for an anti-dazzling layer, in order to form an aggregated part having a desired three-dimensional structure in particles of a material other than acrylic beads, styrene beads were used as the first light transparent fine particles, and melamine beads were used as the second light transparent fine particles.

Example 17

An optical laminate was produced in the same manner as in Example 12, except that composition 13 for an anti-dazzling layer was used. In composition 13 for an anti-dazzling layer, in order to form an aggregated part having a desired three-dimensional structure in a resin matrix, styrene beads were used as the first transparent fine particles in a zirconia-containing resin matrix (refractive index: 1.63), and acrylic beads were used as the second light transparent fine particles. The first light transparent fine particles and second light transparent fine particles were selected so that they were different from each other in particle diameter to constitute a mixed particle system composed of the first and second light transparent fine particles.

Example 18

An antistatic layer (an AS layer) was coated onto a transparent base material under the following conditions. The procedure of Example 14 was then repeated, except that composition 13 for an anti-dazzling layer was coated onto the antistatic layer. Thus, an optical laminate was produced.

Formation of Anti-Dazzling Laminate with Antistatic Layer

The composition for an antistatic layer was coated on a triacetylcellulose to a thickness of 1.2 μm, and the coating was dried at 70° C. for one min. UV (ultraviolet) light was applied at an exposure of 54 mj under nitrogen purge for half curing. Next, composition 7 for an anti-dazzling layer was coated on the antistatic layer to a thickness of 6 μm, and the coating was dried at 70° C. for one min, followed by exposure to UV light at 100 mj under nitrogen purge to cure the coating.

Example 19

A lower-refractive index layer was coated onto the anti-dazzling layer with an antistatic layer in Example 18 under the following conditions.

Production of Anti-Dazzling Laminate with Lower-Refractive Index Antistatic Layer An anti-dazzling laminate with an antistatic layer was produced in the same manner as in Example 18, except that UV curing conditions for the anti-dazzling layer in the anti-dazzling laminate with an antistatic layer in Example 18 were changed to the application of UV (ultraviolet light) at 14 mj under nitrogen purge for half curing. Further, a lower-refractive index layer was formed using a composition for a lower-refractive index layer on the anti-dazzling layer in the same manner as in the coating of the above lower-refractive index layer. Thus, an optical laminate was produced.

Example 20

An optical laminate was produced in the same manner as in Example 1, except that composition 15 for an anti-dazzling layer was used. In the light transparent fine particles in composition 15 for an anti-dazzling layer, in the same manner as in Example 4, monodisperse acrylic beads having a size of 13.5 μm were added in the same proportion. Further, amorphous silica having an average particle diameter of 2.5 μm was added in an amount of 0.75 time the total weight of the monodisperse acrylic beads.

Comparative Example 1

An optical laminate having an anti-dazzling-free smooth and clear optical laminate was produced as follows. An 80 μm-thick triacetylcellulose film (TD80U, manufactured by Fuji Photo Film Co., Ltd.) was provided as a transparent base material. Composition 1 for a surface modifying layer, which is a clear composition free from light transparent fine particles, was coated onto the film with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ for half curing to cure the coating film. Thus, a 7 μm-thick clear hard coat layer was formed.

Comparative Example 2

A conventional anti-dazzling optical laminate (AG) was prepared as follows to produce an optical laminate. Specifically, an 80 μm-thick triacetylcellulose film (TD80U, manufactured by Fuji Photo Film Co., Ltd.) was provided as a transparent base material. Composition 16 for an anti-dazzling layer was coated onto the transparent base material with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to form a 3 μm-thick anti-dazzling hard coat layer. The optical laminate thus obtained is an anti-dazzling optical laminate (AG) using amorphous silica having an average particle diameter of 2.5 μm as the light transparent fine particles.

Comparative Example 3

A conventional anti-dazzling optical laminate (AG) was prepared as follows to produce an optical laminate as sample 23. The optical laminate was produced in the same manner as in Comparative Example 2, except that composition 17 for an anti-dazzling layer containing amorphous silica having an average particle diameter of 1.5 μm was used. The optical laminate of Comparative Example 3 was also an anti-dazzling optical laminate (AG) using amorphous silica. In this case, the addition amount of silica is so large that the haze value is high due to surface irregularities (surface concaves and convexes), resulting in deteriorated scintillation value and glossy black feeling. When surface irregularities (surface concaves and convexes), which provide a high level of surface haze value, are provided as in this comparative example, external light is reflected from the surface concaves and convexes and, consequently, light scattering occurs. Therefore, in this case, interference fringes in the interface of the base material and the anti-dazzling layer are not observed from the viewer side. The observation under a laser microscope, however, shows that the interface exists between the base material and the anti-dazzling optical laminate and interference fringes are formed.

Evaluation Tests

Evaluation 1

Optical Characteristics Test

For the optical laminates of Examples and Comparative Examples, the surface haze value (Hs) (%), Rz, scintillation value ($G_{100}$), and the number of convexes per unit area (/mm$^2$) were measured. The results are shown in Table 1. In the case of Examples, parameters (Sm, θa, and Rz) representing the surface roughness of the optical laminate were measured under measuring conditions A.

Evaluation 2

Glossy Black Feeling Test

A crossed Nicol polarizing plate was applied onto each of the optical laminates of Examples and Comparative Examples on its side remote from the film face. Sensory evaluation was carried out under three-wavelength fluorescence, and glossy black feeling (reproduction of wet glossy black) was evaluated in detail according to the following criteria.
Evaluation Criteria
○: Black could be reproduced.
Δ: Black could be somewhat reproduced but was unsatisfactory as a product.
x: Black could not be reproduced.
Evaluation 3: Interference Fringes Evaluation Test
A crossed Nicol polarizing plate was applied onto each of the optical laminates of Examples and Comparative Examples on its side remote from the film face. Sensory evaluation was carried out under three-wavelength fluorescence to determine the occurrence of interference fringes. The results were evaluated in detail according to the following criteria.
Evaluation Criteria
○: No interference fringe was formed in visual observation in all azimuth directions.
x: Interference fringes could be confirmed in visual observation in all azimuth directions.

Evaluation 4

Substantial Elimination of Interference Fringes (Interface)

The optical laminate was observed for the interference of the base material and the (anti-dazzling) optical laminate under a laser microscope.
The optical laminate according to the present invention has substantially no interference between the light transparent base material and the optical laminate stacked on the light transparent base material. The cross section of the optical laminate was observed under a laser microscope to determine whether or not the interface was substantially present. In this case, when the presence of interference fringes is visually confirmed in the cross section of the laminate, the optical laminate was regarded as having the interface, while, when the absence of interference fringes is visually confirmed in the cross section of the laminate, the optical laminate was regarded as having no interface, and the results were evaluated according to the following criteria. Specifically, in the measurement, the cross section of the optical laminate was subjected to transmission observation under a confocal laser microscope (LeicaTCS-NT, manufactured by Leica: magnification "500 to 1000 times"). In order to provide a halation-free sharp image, a wet objective lens was used in a confocal laser microscope, and about 2 ml of an oil having a refractive index of 1.518 was placed on an optical laminate, followed by observation to determine the presence or absence of the interface. The oil was used to allow the air layer between the objective lens and the optical laminate to disappear.
Evaluation Criteria
○: No interference was observed.
x: Interference was observed.

TABLE 1

| | Composition for anti-dazzling layer | | | | | | Evaluation 1 | | | | | | |
|---|---|---|---|---|---|---|---|---|---|---|---|---|---|
| | Light transparent fine particles | | | Binder | | Solvent composition | | | | | | | |
| | Particle diameter | Material | Weight ratio per unit area between resin and particle | Addition amount of polymer (based on binder) | Monomer ratio | (Ratio of toluene to coating composition component) | Hs (%) | G100 | Rz | Evaluation 1 | Evaluation 2 | Evaluation 3 | Evaluation 4 |
| Ex. 1 | 5.0 μm | PMMA (Hydrophobic behavior) | 0.20 | PMMA polymer 10 wt % (mw 75000) | PETA:DPHA = 65:35 wt % | Toluene:cyclohexanone = 80:20 wt % (40.5 wet %) | 0.3 | 4 | 0.606 | ○ | ○ | ○ | ○ |
| Ex. 2 | 9.5 μm | → | → | → | → | → | 0.4 | 6 | 0.663 | ○ | ○ | ○ | ○ |
| Ex. 3 | 13.5 μm | → | → | → | → | → | 0.6 | 7 | 1.040 | ○ | ○ | ○ | ○ |
| Ex. 4 | 13.5 μm | → | 0.10 | → | → | → | 0.5 | 6 | 0.833 | ○ | ○ | ○ | ○ |
| Ex. 5 | 9.5 μm | → | 0.015 | → | → | → | 0.4 | 4 | 0.482 | ○ | ○ | ○ | ○ |
| Ex. 6 | 5.0 ± 2.0 (particle size distribution) | → | 0.20 | → | → | → | 0.4 | 7 | 0.834 | ○ | ○ | ○ | ○ |
| Ex. 7 | A) 9.5 μm B) 5.0 μm Mixed particle system | → | A) 0.15 B) 0.05 | → | → | → | 0.5 | 5 | 0.743 | ○ | ○ | ○ | ○ |
| Ex. 8 | 13.5 μm | → | 0.10 | → | → | → | 1.4 | 6 | 0.893 | ○ | ○ | ○ | ○ |
| Ex. 9 | → | → | → | → | → | → | 1.8 | 7 | 0.982 | ○ | ○ | ○ | ○ |
| Ex. 10 | → | → | → | → | → | → | 0.5 | 6 | 0.732 | ○ | ○ | ○ | ○ |
| Ex. 11 | → | → | → | → | → | → | 1.3 | 5 | 0.652 | ○ | ○ | ○ | ○ |
| Ex. 12 | 1.9 μm | PMMA (Hydrophilic behavior) | 0.18 | PMMA polymer 8 wt % (mw 75000) St = PMMA polymer 2 wt % (mw 65000) | PETA:DPHA = 70:30 wt % | Toluene:cyclohexanone = 80:20 wt % (42.0 wet %) | 3.8 | 9 | 1.046 | ○ | ○ | ○ | ○ |
| Ex. 13 | 4.6 μm | PMMA (Hydrophobic behavior) | 0.26 | PMMA polymer 10 wt % (mw 75000) | → | → | 4.7 | 12 | 1.547 | ○ | ○ | ○ | ○ |
| Ex. 14 | A) 4.6 μm B) 3.5 μm Mixed particle system | → | A) 0.15 B) 0.05 | → | → | → | 3.2 | 13 | 1.634 | ○ | ○ | ○ | ○ |
| Ex. 15 | A) 3.5 μm (n = 1.53) B) 3.5 μm (n = 1.52) Mixed particle system *Different in composition | PMMA (Different in crosslinking agent) | A) 0.15 B) 0.05 | → | → | → | 2.8 | 11 | 1.342 | ○ | ○ | ○ | ○ |
| Ex. 16 | A) 5.0 μm B) 1.8 μm Mixed particle system | A) St B) Melamine | A) 0.15 B) 0.09 | → | → | → | 4.8 | 3 | 1.285 | ○ | ○ | ○ | ○ |
| Ex. 17 | A) 3.5 μm B) 1.5 μm Mixed particle system | PMMA (Hydrophobic behavior) | A) 0.10 B) 0.09 | PMMA polymer 10 wt % (mw 45000) | Coating liquid 10 for anti-dazzling layer | → | 3.8 | 4 | 1.110 | ○ | ○ | ○ | ○ |

TABLE 1-continued

| | Composition for anti-dazzling layer | | | Binder | | Solvent composition | Evaluation 1 | | | Evaluation 2 | Evaluation 3 | Evaluation 4 |
|---|---|---|---|---|---|---|---|---|---|---|---|---|
| | Light transparent fine particles | | | | | | | | | | | |
| | Particle | Material | Weight ratio per unit area between resin and particle | Addition amount of polymer (based on binder) | Monomer ratio | (Ratio of toluene to coating composition component) | Hs (%) | G100 | Rz | | | |
| Ex. 18 | A) 4.6 μm B) 3.5 μm Mixed particle system | → | A) 0.15 B) 0.05 | → | (Zr-containing resin matrix) n = 1.60 PETA:DPHA = 70:30 wt % | → | 2.8 | 13 | 1.665 | ○ | ○ | ○ |
| Ex. 19 | → | → | → | → | → | → | 3.2 | 14 | 1.754 | ○ | ○ | ○ |
| Ex. 20 | A) 13.5 μm B) 2.5 ± 2.0 μm Mixed particle system | → | A) 0.10 B) 0.075 | → | → | Toluene:cyclohexanone = 80:20 wt % (42.0 wet %) | 0.9 | 2 | 0.721 | ○ | ○ | ○ |
| Comp. Ex. 1 | — | — | — | PMMA polymer 10 wt % (mw 75000) | PETA = 100 | Toluene:cyclohexanone = 90:10 wt % (45.0 wet %) | 0.3 | 1 | 0.278 | ○ | × | × |
| Comp. Ex. 2 | Average particle diameter 2.5 μm Amorphous silica | Silica | 0.10 | → | → | Toluene:MIBK = 90:10 wt % (40.5 wet %) | 3.0 | x (23) | 1.958 | △ | × | × |
| Comp. Ex. 3 | Average particle diameter 1.5 μm Amorphous silica | → | 0.12 | → | → | → | 12.8 | x (18) | 1.892 | × | ○ | × |

The invention claimed is:

1. An optical laminate comprising:
   a light transparent base material;
   an anti-dazzling layer having a concavoconvex shape provided on the light transparent base material, wherein the anti-dazzling layer contains fine particles having an average particle diameter of 1.9 μm or more and 13.5 μm or less; and
   a surface modifying layer, which smoothes concavoconvexes of the concavoconvex shape by sealing fine concavoconvexes present along the concavoconvex shape, or which regulates spacing between convex peaks of the concavoconvexes, heights of convex peaks and numbers of convex peaks, provided on the concavoconvex shape of the anti-dazzling layer, the surface modifying layer having a concavoconvex shape and a cured state thickness of not less than 3.0 μm and not more than 8.0 μm;
   wherein the optical laminate simultaneously satisfies formulae (I) to (III):

$$2 \leq G_{100} \leq 7 \quad (I)$$

$$0.3\% \leq Hs \leq 1.8\% \quad (II)$$

$$0.606\ \mu m \leq Rz \leq 0.982\ \mu m \quad (III)$$

wherein $G_{100}$ represents a scintillation value which is a standard deviation of a variation in brightness distribution at a resolution of 100 ppi measured on the surface of the optical laminate, Hs represents the surface haze value of the optical laminate, and Rz represents the average roughness of the concavoconvex shape of the surface modifying layer;
   wherein the standard deviation of a variation in brightness distribution is one for image data incorporated so that light from a light source is introduced into the optical laminate through a matrix filter with a resolution of 100 ppi, and light transmitted through the optical laminate is recognized, and the transmitted light is incorporated as image data in which an average brightness of the incorporated image is 145 cd/m$^2$;
   wherein the surface modifying layer is formed of a composition comprising one material or a mixture of two or more materials selected from the group consisting of an antistatic agent, a refractive index regulator and an ionizing radiation curing resin;
   wherein the refractive index regulator is selected from the group consisting of zinc oxide, titania, ceria, tin-doped indium oxide, antimony-doped tin oxide, yttria and zirconia; and
   wherein the ionizing curing resin is selected from the group consisting of pentaerythritol triacrylate and dipentaerythritol hexaarcrylate.

2. A polarizing plate comprising a polarizing element, wherein
   an optical laminate according to claim 1 is provided on the surface of the polarizing element so that the surface of the polarizing element faces the optical laminate on its side remote from the anti-dazzling layer.

3. An image display device comprising: a transmission display; and a light source device for applying light to the transmission display from its backside, wherein
   an optical laminate according to claim 1 is provided on the surface of the transmission display.

4. An image display device comprising: a transmission display; and a light source device for applying light to the transmission display from its backside, wherein
   a polarizing plate according to claim 2 is provided on the surface of the transmission display.

* * * * *